US012777487B2

(12) United States Patent
Khoshnevisan et al.

(10) Patent No.: US 12,777,487 B2
(45) Date of Patent: Oct. 27, 2026

(54) TECHNIQUES FOR DOWNLINK CONTROL INFORMATION PROCESSING

(71) Applicant: QUALCOMM Incorporated, San Diego, CA (US)

(72) Inventors: Mostafa Khoshnevisan, San Diego, CA (US); Yi Huang, San Diego, CA (US); Jing Sun, San Diego, CA (US); Xiaoxia Zhang, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 969 days.

(21) Appl. No.: 17/686,243

(22) Filed: Mar. 3, 2022

(65) Prior Publication Data

US 2022/0295539 A1 Sep. 15, 2022

Related U.S. Application Data

(60) Provisional application No. 63/160,646, filed on Mar. 12, 2021.

(51) Int. Cl.
*H04W 72/23* (2023.01)
*H04W 72/21* (2023.01)

(52) U.S. Cl.
CPC ........... *H04W 72/23* (2023.01); *H04W 72/21* (2023.01)

(58) Field of Classification Search
CPC .............................. H04W 72/23; H04W 72/21
See application file for complete search history.

(56) References Cited

U.S. PATENT DOCUMENTS

2017/0310447 A1 10/2017 Kusashima et al.
2019/0230697 A1* 7/2019 Yang .................... H04L 1/1845

(Continued)

FOREIGN PATENT DOCUMENTS

CN 107690762 A 2/2018
TW 201947965 A 12/2019

(Continued)

OTHER PUBLICATIONS

ETSI TS 138 213—V16.4.0—5G; NR; Physical layer procedures for control (3GPP TS 38.213 version 16.4.0 Release 16) (Year: 2021).*

(Continued)

*Primary Examiner* — Siming Liu
(74) *Attorney, Agent, or Firm* — Holland & Hart LLP

(57) ABSTRACT

Methods, systems, and devices for wireless communication at a user equipment (UE) are described. A first network node may receive, from a second network node, downlink control information based on monitoring at least one of a first physical downlink control channel candidate or a second physical downlink control channel candidate that are linked for physical downlink control channel repetition. In some examples, the second physical downlink control channel candidate may end later in time than the first physical downlink control channel candidate. The first network node may identify an absence of a scheduled physical downlink shared channel based on the downlink control information. The first network node may then transmit, to the base station, a feedback message in response to the downlink control information at least a threshold number of time units after the second physical downlink control channel candidate.

21 Claims, 22 Drawing Sheets

(56) References Cited

U.S. PATENT DOCUMENTS

| | | | |
|---|---|---|---|
| 2020/0205150 A1 | 6/2020 | Cheng et al. | |
| 2020/0351890 A1 | 11/2020 | Tsai et al. | |
| 2021/0029561 A1 | 1/2021 | Lin et al. | |
| 2021/0168776 A1* | 6/2021 | Li | H04W 74/0808 |
| 2021/0274519 A1 | 9/2021 | Fakoorian et al. | |
| 2023/0199773 A1* | 6/2023 | Cirik | H04L 1/08 370/329 |

FOREIGN PATENT DOCUMENTS

| | | | |
|---|---|---|---|
| TW | 202007110 | A | 2/2020 |
| WO | WO-2019214264 | A1 | 11/2019 |
| WO | WO-2020006416 | A1 | 1/2020 |
| WO | WO-2021022736 | A1 | 2/2021 |
| WO | WO-2021227008 | A1 | 11/2021 |

OTHER PUBLICATIONS

International Search Report and Written Opinion—PCT/US2022/018906—ISA/EPO—Jul. 15, 2022.

Sharp: "Enhancement on Inter-Cell Multi-TRP Operation", 3GPP TSG RAN WG1 #102, R1-2006567, 3GPP, Mobile Competence Centre, 650, Route Des Lucioles, F-06921, Sophia-Antipolis Cedex, France, vol. RAN, WG1, No. e-Meeting, Aug. 17, 2020-Aug. 28, 2020, Aug. 8, 2020, XP051918121, pp. 1-3, URL:https://ftp.3gpp.org/tsg_ran/WG1_RL1/TSGR1_102-e/Docs/R1-2006567.zip R1-2006567.docx.

"3rd Generation Partnership Project, Technical Specification Group Radio Access Network, NR, Physical layer procedures for control (Release 16)", 3GPP Standard, Technical Specification, 3GPP TS 38.213, 3rd Generation Partnership Project (3GPP), Mobile Competence Centre, 650, Route Des Lucioles, F-06921 Sophia-Antipolis Cedex, France, vol. RAN WG1, No. V16.4.0, Jan. 8, 2021 (Jan. 8, 2021), pp. 1-181, XP051999687, Retrieved from the Internet: URL: https://ftp.3gpp.org/Specs/archive/38_series/38.213/38213-g40.zip 38213-g40.docx [Retrieved on Jan. 8, 2021], Sections 7.3-7.3.1, 9.1.3.1, 9.2.5 and 10.3, p. 53-p. 57, pp. 86-88, p. 120-p. 123.

Lenovo, et al., "Enhancements on Multi-TRP for PDCCH, PUCCH and PUSCH", 3GPP Draft, 3GPP TSG RAN WG1 #103-e, R1-2008911, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946723, 15 Pages, Retrieved from the Internet: URL: https://ftp.3gpp.org/tsg_ran/WG1_RL1/TSGR1_103-e/Docs/R1-2008911.zip R1-2008911 PDCCH PUCCH and PUSCH Enhancements with Multi-TRP_Final.doc [Retrieved on Oct. 24, 2020] pp. 2-3, the Agreements: "For mTRP PDCCH reliability enhancements, . . . ", . . . , "For non-SFN based mTRP PDCCH reliability enhancements, . . . ", etc. section "2.1 Transmission schemes for enhanced PDCCH" , section "2.2 Configuration for CORESET and search space set", section "2.3 Coding/rate matching chain and UE decoding behavior", section "2.4, 3, 4 Linkage between PDCCH candidates"—the entire section, p. 8-p. 9.

Moderator (QUALCOMM): "Summary #2 of Email Discussions [104-e-NR-feMIMO-02] for mTRP PDCCH Enhancements", 3GPP TSG-RAN WG1 Meeting #104-e, 3GPP Draft, R1-2101839, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 29, 2021 (Jan. 29, 2021), XP051975935, 25 Pages, Retrieved from the Internet: URL: https://ftp.3gpp.org/tsg_ran/WG1_RL1/TSGR1_104-e/Docs/R1-2101839.zip R1-2101839 Summary #2 of email discussions [104-e-NR-feMIMO-02] for mTRP PDCCH enhancements.docx [retrieved on Jan. 29, 2021] section 6, sections 1, 3, 4, 5, 5.1.

Partial International Search Report—PCT/US2022/018906—ISA/EPO—May 30, 2022.

Taiwan Search Report—TW111108202—TIPO—Jun. 15, 2025.

ETSI: "5G; NR; Physical layer procedures for control (3GPP TS 38.213 version 15.12.0 Release 15)", ETSI TS 138 213 V15.12.0 (Jan. 2021), Section 10.2, p. 84, Jan. 2021, URL: https://portal.3gpp.org/desktopmodules/Specifications/SpecificationDetails.aspx?specificationId=3215, ETSI, Sophia Antipolis Cedex, France, 113 pages.

ETSI: "5G; NR; Physical layer procedures for control (3GPP TS 38.213 version 16.4.0 Release 16)", ETSI TS 138 213 V16.4.0 (Jan. 2021), Section 10.2, pp. 118-120, Jan. 2021, URL: https://portal.3gpp.org/desktopmodules/Specifications/SpecificationDetails.aspx?specificationId=3215 ETSI, Sophia Antipolis Cedex, France, 185 pages.

Taiwan Search Report—TW111108202—TIPO—Apr. 17, 2026.

* cited by examiner

TECHNIQUES FOR DOWNLINK CONTROL INFORMATION PROCESSING

CROSS REFERENCE

The present Application for Patent claims the benefit of U.S. Provisional Patent Application No. 63/160,646 by KHOSHNEVISAN et al., entitled "TECHNIQUES FOR CALCULATING DOWNLINK CONTROL INFORMATION PROCESSING TIME," filed Mar. 12, 2021, assigned to the assignee hereof, and expressly incorporated by reference in its entirety herein.

FIELD OF TECHNOLOGY

The following relates to wireless communication UE, including techniques for downlink control information processing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some NR systems, two search space sets associated with the same control resource set (CORESET) may overlap, meaning that they may have overlapping resource blocks, use the same scrambling, and have the same transmission configuration indicator (TCI) state. Some wireless communications systems may support physical downlink control channel repetition, where each repetition is a physical downlink control channel candidate, and two physical downlink control channel candidates are linked together for repetition of a common control information. As demand for communication efficiency increases, it may be desirable to provide improvements to such communications systems.

SUMMARY

The described techniques relate to improved methods, systems, nodes, devices, and apparatuses that support techniques to resolve ambiguity for a downlink control information in transmitted using two or more physical downlink control channel candidates. In some examples, techniques described herein provide for a network node (e.g., user equipment (UE)) to receive downlink control information using a first physical downlink control channel candidate or a second physical downlink control channel candidate that are linked for physical downlink control channel repetition. In some examples, the second physical downlink control channel candidate may end later in time than the first physical downlink control channel candidate. In some examples, the network node may determine to transmit a feedback message at least a threshold number of time units after the second physical downlink control channel candidate. Additionally or alternatively, the network node may determine to override an uplink control resource indicated by a prior downlink control information based at on determining that the uplink control resource is at least a threshold number of time units after the second physical downlink control channel candidate.

DETAILED DESCRIPTION

Figure 1:
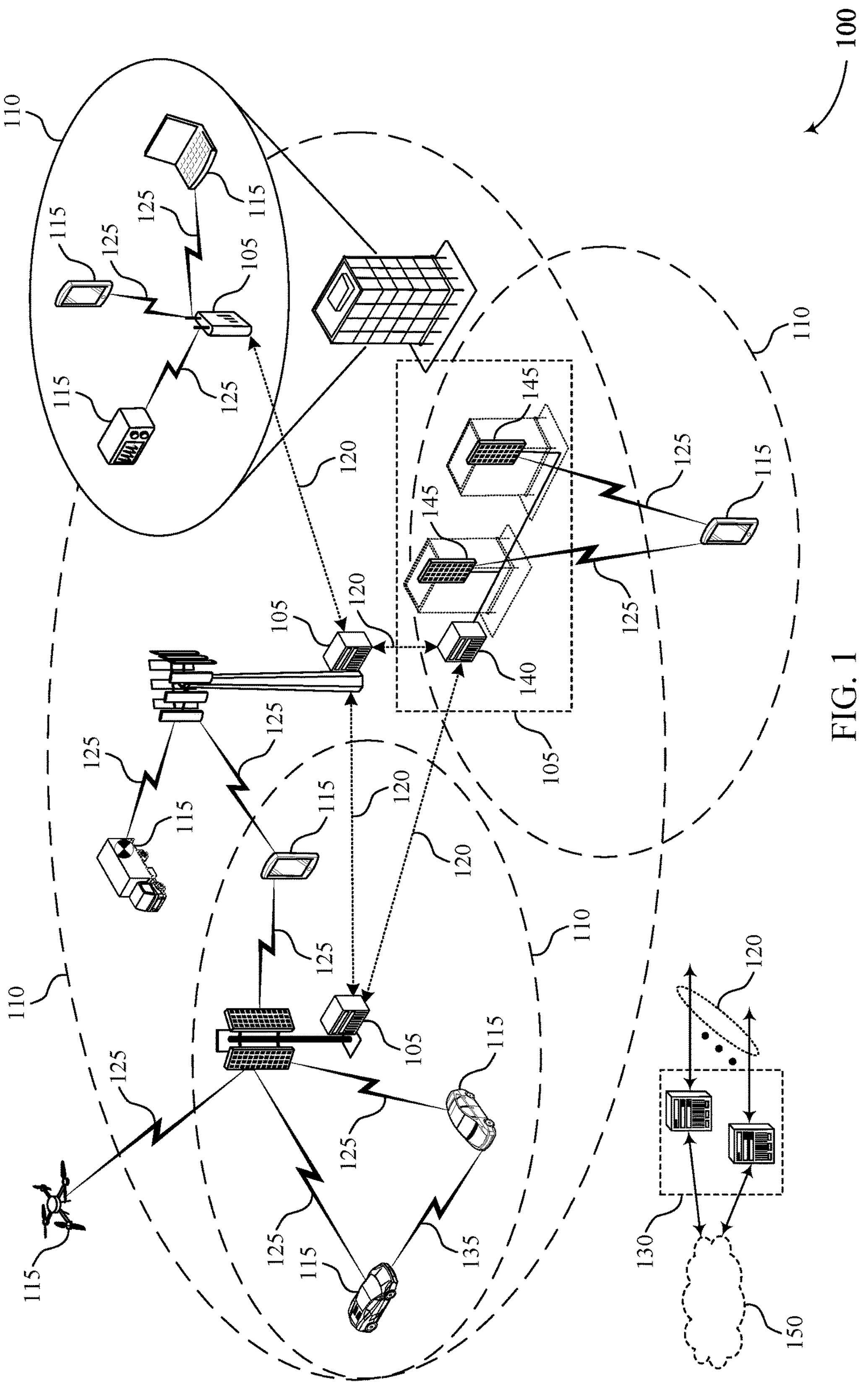
FIG. 1 illustrates an example of a wireless communications system that supports techniques for downlink control information processing in accordance with aspects of the present disclosure.

The described techniques relate to improved methods, systems, devices, and apparatuses that support techniques for downlink control information processing. In some wireless communications systems, two search space sets may be associated with the same control resource set (CORESET). Some wireless communications systems may support physical downlink control channel repetition, where each repetition is a physical downlink control channel candidate, and two physical downlink control channel candidates are linked together for repetition of the same downlink control information. Physical downlink control channel repetition may be used, for example, to increase reliability or add redundancy. For example, wireless communication in a network may suffer from interference. Depending on the amount of interference, a user equipment (UE) may potentially no longer decode individual physical downlink control channel candidates. Two physical downlink control channel candidates may be linked together for repetition to increase reliability. A UE may soft combine the respective signals to decode the downlink control information.

In another example, a network may use two different beams to transmit repeated physical downlink control channel for redundancy. If one beam is blocked or the aggregation level is too small, a network node (e.g., UE) may potentially be able to decode the downlink control information from the other beam. The downlink control information payload transmitted using the two physical downlink control channel candidates may be the same.

A network node may either perform soft combining of signals associated with the physical downlink control channel candidates to decode the downlink control information or decodes the downlink control information using one of the physical downlink control channel candidates that are linked together. In some cases, a timeline may be defined for a subsequent physical downlink shared channel processing by the downlink control information (e.g., in those cases where the downlink control information schedules the (subsequent) physical downlink shared channel transmission).

However, other cases may exist where the downlink control information does not schedule a physical downlink shared channel, the timeline for downlink control information processing may be ambiguous. For example, the timeline for responding with a feedback transmission to for downlink control information may not be defined, for example, when downlink control information is received using multiple physical downlink control channel candidates, and it is ambiguous which one of the multiple physical downlink control channel candidates may serve as a unique reference point for the timeline. In another example, the timeline for overriding (multiplexing) a feedback message in a physical uplink control channel resources associated with a downlink control information may be ambiguous.

One or more aspects of the present disclosure provides for techniques for determining the timeline for downlink control information processing. In a first example, the network node may receive downlink control information using two physical downlink control channel candidates. For example, the network node may receive downlink control information based on monitoring at least one first physical downlink control channel candidate or a second physical downlink control channel candidate that are linked for physical downlink control channel repetition. In some examples, the second physical downlink control channel candidate may end later in time than the first physical downlink control channel candidate. When the network node detects a specific downlink control information format using two physical downlink control channel candidates and identifies that the downlink control information does not schedule a physical downlink shared channel, then the network node may transmit a feedback message during a time unit that is at least a threshold number of time units after the second physical downlink control channel candidate. That is, the network node may expect transmitting the feedback message no earlier than a threshold number of symbols (e.g., N symbols) after the second physical downlink control channel candidate (e.g., physical downlink control channel candidate that ends later in time).

In a second example, a network node may receive multiple downlink control information pointing to a same slot for feedback transmission. For example, the network node may receive a first downlink control information and a second downlink control information at a later time than the first downlink control information. Particularly, the network node may receive the second downlink control information based on monitoring at least one of a first physical downlink control channel candidate or a second physical downlink control channel candidate for physical downlink control channel repetition. In some examples, the second physical downlink control channel candidate ends later in time than the first physical downlink control channel candidate.

The network node may override the feedback message to transmit in the first physical uplink control channel resource based on determining that a time unit associated with the first physical uplink control channel resource is at least a threshold number of time units after the second physical downlink control channel candidate.

Particular aspects of the subject matter described in this disclosure may be implemented to realize one or more of the following potential improvements, among others. The techniques employed by the network node may provide benefits and enhancements to the operation of the network node. For example, operations performed by the network node may provide improvements to communications when operating in wireless communications systems. In some examples, configuring the network node to support techniques for downlink control information processing, among other examples in wireless communications systems, may support improvements in power consumption, resource usage, coverage enhancements, spectral efficiency, higher data rates, among other benefits.

Aspects of the disclosure are initially described in the context of wireless communications systems. Aspects of the disclosure are further illustrated by and described with reference to block diagrams and process flows. Aspects of the disclosure are further illustrated by and described with reference to apparatus diagrams, system diagrams, and flowcharts that relate to techniques for downlink control information processing.

FIG. 1 illustrates an example of a wireless communications system 100 that supports techniques for downlink control information processing in accordance with aspects of the present disclosure. The wireless communications system 100 may include multiple network nodes such as one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a downlink control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to one or more aspects of the present disclosure, a network node such as a UE 115 may receive, from another network node such as a base station 105, downlink control information based on monitoring at least one of a first physical downlink control channel candidate or a second physical downlink control channel candidate that are linked for physical downlink control channel repetition. In some examples, the second physical downlink control channel candidate ends later in time than the first physical downlink control channel candidate. The UE 115 may identify that the downlink control information is not scheduling a physical downlink shared channel transmission. Additionally or alternatively, the UE 115 may determine that the second physical downlink control channel candidate spans a time period ending in a second time unit. The UE 115 may then transmit, to the base station 105, a feedback message in response to the downlink control information during a time unit that is at least a threshold number of time units after the second physical downlink control channel candidate. In an example where the second physical downlink control channel candidate spans a time period ending in the second time unit, the UE 115 may transmit the feedback message during the time unit that is at least the threshold number of time units after the second time unit.

According to one or more aspects of the present disclosure, the UE 115 may determine a first physical uplink control channel resource to transmit a feedback message. In some examples, the UE 115 may receive a first downlink control information and may determine the first physical uplink control channel resource as indicated by the first downlink control information. In some examples, the UE 115 may receive, from a base station 105, a second downlink control information based on monitoring at least one of a first physical downlink control channel candidate or a second physical downlink control channel candidate that are linked for physical downlink control channel repetition. In some examples, the second physical downlink control channel candidate ends later in time than the first physical downlink control channel candidate. The UE 115 may then determine to override the feedback message to transmit in the first physical uplink control channel resource based on determining that a time unit associated with the first physical uplink control channel resource is at least a threshold number of time units after the second physical downlink control channel candidate.

Figure 2:
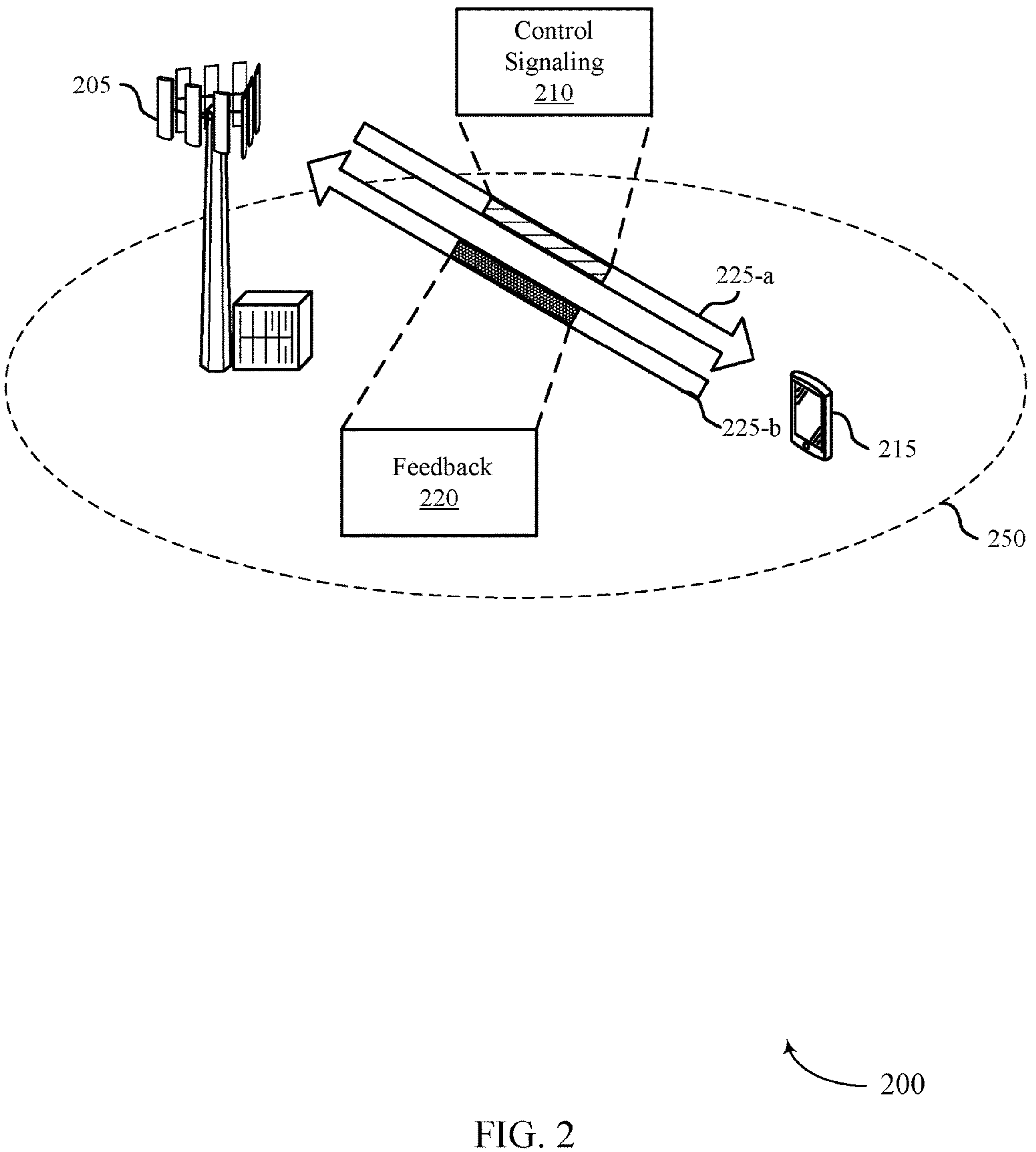
FIG. 2 illustrates an example of a wireless communications system that supports techniques for downlink control information processing in accordance with aspects of the present disclosure.

FIG. 2 illustrates an example of a wireless communications system 200 that supports techniques for downlink control information processing in accordance with aspects of the present disclosure. In some examples, the wireless communications system 200 may implement aspects of the wireless communications system 100. For examples, the wireless communications system 200 may include a network nodes such as a base station 205 which may be an example of the corresponding devices described with reference to FIG. 1 (e.g., a base station 105). The wireless communications system 200 may also include a network node such as a UE 215, which may be an example of the corresponding devices described with reference to FIG. 1 (e.g., a UE 115). For example, the wireless communications system 200 may support techniques for processing downlink control information when downlink control information is received using multiple physical downlink control channel candidates.

Base station 205 may serve one or more UEs 115, including UE 215, within coverage area 250. The base station 205 may transmit messages to UE 215 over downlink communication link 225-*a*. The UE 215 may receive message (e.g., control signaling 210 including downlink control information) from the base station 205. The UE 215 may communicate with the base station 205 by transmitting messages over uplink communications link 225-*b*. According to one or more aspects, the wireless communications system 200 may support techniques to determine a timing for transmission of feedback based on a timing of reception of the control signaling 210.

The UE 215 may be configured for two or more search space sets. In some examples, the base station 205 may configure the UE 215 for the search space sets. In other examples, the UE 215 configures itself for the search space sets according to a specification. When configuring a physical downlink control channel, the UE 215 can have up to three or five CORESETs in a given BWP for a component carrier of a serving cell. The CORESETs may be used to configure the physical downlink control channel. Each CORESET may be associated with one active TCI state. In some examples, properties of CORESETs may include a TCI state for physical downlink control channel, resource blocks in the frequency domain, and a number of symbols of CORESET in the time domain. As part of CORESET configurations, resource blocks of a CORESET in frequency domain and the number of symbols of CORESET (e.g., 1/2/3 OFDM symbols) may be configured by a control signal (e.g., RRC signal).

Other properties of a CORESET may include a CCE resource element group (REG) bundle mapping type, precoding granularity, and scrambling identifier (ID). These parameters may be used for a physical downlink control channel demodulation reference signal or coded bits of downlink control information content. In some examples, the CCE-REG bundling mapping type may be the same as a REG bundle for narrowband channel estimation or wideband precoding in the entire CORESET.

Once the CORESETs are configured, one or more search space sets may also be configured for monitoring physical downlink control channel. In some examples, each search space set may be associated with one CORESET. The UE 215 may be configured with up to ten search space sets in a given BWP of a component carrier, in some examples. As part of the configuration of the search space sets, each search space set may be associated with a given CORESET, which may be identified. The number of symbols may be the time domain behavior in the CORESET, but which slot and symbol may be used for the physical downlink control channel may be part of the configuration of the search space set.

The search space sets may be configured for the time domain, monitoring occasions of the physical downlink control channel, and a periodicity (e.g., a number of slots) and an offset to determine which slots are monitored. The periodicity (denoted as $k_s$ slots) and offset (denoted as $o_s$ slots) may be configured using a parameter monitoringSlotPeriodicityAndOffset in units of slots. For example, if the periodicity is five slots ($k_s$=5 slots), there may be one search space for each period (e.g., there is at least one slot in the five slots where the search space exists).

The search space sets may also be configured with a parameter duration (denoted $T_s$), which may show in how many slots the search space set exists (e.g., $T_s<k_s$). If the parameter duration is two, then in each periodicity of five slots, the search space set exists in two of the slots.

In each slot that the search space set exists, a physical downlink control channel monitoring pattern within a slot may be indicated by a parameter MonitoringSymbolsWithinSlot. The physical downlink control channel monitoring pattern may be a bitmap of fourteen symbols and every 1 in the bitmap (e.g., 010000100000, etc.) may indicate the first symbol of the CORESET for that monitoring occasion. If there are three 1s in the bitmap, then there are three monitoring occasions in the slot, and the location of the is indicate the first symbol of the CORESET for that monitoring occasion. For example, if it is assumed that the search space set has three symbols, then there are three monitoring occasions for each slot of the physical downlink control channel in which the search space set is monitored.

A type of search space set can be UE-specific or a common search space set type. The configuration of search space sets may also configure which downlink control information formats the UE 215 is to monitor. In some examples, the physical downlink control channel candidates may also be configured as part of the search space set configuration. For example, a number of physical downlink control channel candidates may be configured for each aggregation level.

According to one or more aspects, the UE 215 may identify at least a first monitoring occasion in the first search space set to monitor for a first physical downlink control channel candidate and a second monitoring occasion in the second search space set to monitor for a second physical downlink control channel candidate based on the first search space set including the downlink control information and the second search space set including the repetition of the downlink control information. As depicted herein, the physical downlink control channel candidates may also be configured as part of the search space set configuration. For example, a number of physical downlink control channel candidates may be configured for each aggregation level.

For physical downlink control channel repetition, each repetition may be a physical downlink control channel candidate. Two physical downlink control channel candidates may be linked together for a possible repetition of the same downlink control information. Two physical downlink control channel candidates may have the same aggregation level (e.g., same number of CCEs) and the downlink control information payload transmitted by the two physical downlink control channel candidates may be the same. Therefore, the UE 215 can perform soft combining to decode the downlink control information, using the two physical downlink control channel candidates (e.g., the two physical downlink control channel repetitions). In some examples, two physical downlink control channel candidates in different search space sets (e.g., associated with different CORESETs) may be linked together for physical downlink control channel repetition.

For example, the UE 215 can use different search space sets, which are configured to be linked together, for repetition. For example, a search space set with index 2 may be linked with a search space set with index 4. Each search space set may have a different monitoring occasion (e.g., within a slot or across a slot). For physical downlink control channel repetition and monitoring occasion, a monitoring occasion of a first search space set may be associated or linked with a monitoring occasion of a second search space set. For linking two physical downlink control channel candidates, which may occur within a first monitoring occasion of the first search space set and a second monitoring occasion of the second search space set, one or more of several methods for linking may be used. For example, two physical downlink control channel candidates with the same candidate index across the two search space set may be linked. In another example, two physical downlink control channel candidates with the same start CCEs may be linked. In other examples, the linking may be explicitly provided as an RRC configuration. The RRC configuration may identify which candidate in a first search space set is linked with which candidate in a second search space set, which may be configured to the UE 215. For example, a candidate index in a search space set may be linked with another candidate index in a second search space set. In a further example, the linkage may be RRC configured between the two search space sets, to the extent that the UE is indicated that there exists a linkage. And, the UE 215 may infer the linkage between two control channel candidates based on the same start CCEs.

According to one or more aspects, the UE 215 may identify a link between a first search space set and a second search space set for physical downlink control channel repetition. The link may associate one or more monitoring occasions of each search space set together. As shown herein, the UE 215 may be aware of the linking before decoding a downlink control information. In order to provide the linking, the monitoring occasions of the two linked search space sets may be one-to-one mapped. the physical downlink control channel candidates with the same aggregation level and same candidate index in the two linked search space sets may be linked. Additionally or alternatively, two linked search space sets may be configured with the same number of candidates for each aggregation level. The UE 215 and the base station 205 may support at least one of intra-slot physical downlink control channel repetition or inter-slot physical downlink control channel repetition.

In some examples, timelines may be defined for uplink downlink control information (e.g., downlink control information formats 0_0 or 0_1 or 0_2 scheduling physical uplink shared channel). Physical uplink shared channel preparation timeline (e.g., N2 symbols) may be defined, where N2 is a function of subcarrier spacing and UE capability (based on whether UE supports capability 1 or capability 2). In some instances, the timeline may start after the end of the reception of the last symbol of the physical downlink control channel carrying the downlink control information scheduling the physical uplink shared channel. In some examples, when the downlink control information scheduling the physical uplink shared channel or triggering an aperiodic channel state information is received using two physical downlink control channel candidates that are linked for physical downlink control channel repetition, the timeline may start from the last symbol of the physical downlink control channel candidate that ends later in time.

In some wireless communications systems, a reference physical downlink control channel candidate may be defined as the candidate that ends later in time among the two linked physical downlink control channel candidates in the time domain. The UE 215 may determine the scheduling offset to identify whether the UE 215 is to use a default beam for physical downlink shared channel or CSI-RS reception. In some examples, the UE 215 may identify a definition of in-order for physical downlink control channel-physical downlink shared channel and physical downlink control channel-physical uplink shared channel. That is, in some examples, the ending symbol of physical downlink control channel may be the last symbol of the reference physical downlink control channel candidate. For any two HARQ process IDs in a given scheduled cell, if the UE is scheduled to start receiving a first physical downlink shared channel starting in symbol "j" by a physical downlink control channel ending in symbol "i," then the UE may not be expected to be scheduled to receive a physical downlink shared channel starting earlier than the end of the first physical downlink shared channel by a physical downlink control channel that ends later than symbol "i." Additionally or alternatively, for any two HARQ process IDs in a given scheduled cell, if the UE is scheduled to start a first physical uplink shared channel transmission starting in symbol "j" by a physical downlink control channel ending in symbol "i," then the UE may not be expected to be scheduled to transmit a physical uplink shared channel starting earlier than the end of the first physical uplink shared channel by a physical downlink control channel that ends later than symbol "i."

For physical uplink shared channel preparation time (N2) and channel state information computation time (Z): the last symbol of the physical downlink control channel may be based on the last symbol of the reference physical downlink control channel candidate. If inter-slot physical downlink control channel repetition is supported, for slot offset for scheduling the same physical downlink shared channel or physical uplink shared channel or CSI-RS or sounding reference signal (SRS): the slot of the reference physical downlink control channel candidate may be used as the reference slot. For example, the slot offset for the scheduled physical downlink shared channel, a physical uplink shared channel, a CSI-RS, or an SRS may be applied to a reference, which may be the slot in which the scheduling downlink control information is detected.

In some wireless communications systems, a timeline may be defined for physical downlink shared channel processing for downlink control information. However, there may be examples where the downlink control information does not schedule a physical downlink shared channel, in which case timeline for downlink control information processing may not be defined. Particularly, a timeline for downlink control information processing may not be defined when the downlink control information is received using multiple physical downlink control channel candidates.

In some examples, the UE 215 may provide HARQ acknowledgement (HARQ-ACK) feedback information in response to a semi-persistent scheduling of physical downlink shared channel release after N symbols from the last symbol of a physical downlink control channel providing semi-persistent scheduling of physical downlink shared channel release. If processingType2Enabled of PDSCH-ServingCellConfig is set to enable for the serving cell with the physical downlink shared channel providing the semi-persistent scheduling of physical downlink shared channel release, N=5 for $\mu$=0, N=5.5 for $\mu$=1, and N=11 for $\mu$=2, otherwise, N=10 for $\mu$=0, N=12 for $\mu$=1, N=22 for $\mu$=2, and N=25 for $\mu$=3, where $\mu$ corresponds to the smallest subcarrier spacing configuration between the subcarrier spacing configuration of the physical downlink control channel providing the semi-persistent scheduling of physical downlink shared channel release and the subcarrier spacing configuration of a physical uplink control channel carrying the HARQ-ACK information in response to a semi-persistent scheduling of physical downlink shared channel release.

In some examples, the UE 215 may provide HARQ-ACK information in response to a detection of a downlink control information format 1_1 indicating secondary cell dormancy after N symbols from the last symbol of a physical downlink control channel providing the downlink control information format 1_1. If processingType2Enabled of PDSCH-Serving-CellConfig is set to enable for the serving cell with the physical downlink control channel providing the downlink control information format 1_1, N=7 for $\mu=0$, N=7.5 for $\mu=1$, and N=15 for $\mu=2$; otherwise, N=14 for $\mu=0$, N=16 for $\mu=1$, N=27 for $\mu=2$, and N=31 for $\mu=3$, where $\mu$ is the smallest subcarrier spacing configuration between the subcarrier spacing configuration of the physical downlink control channel providing the downlink control information format 1_0, 1_1, or 1_2 and the subcarrier spacing configuration of a physical uplink control channel with the HARQ-ACK information in response to the detection of the downlink control information format 1_0, 1_1, or 1_2.

In some examples, the downlink control information format may provide a request for a Type-3 HARQ-ACK codebook report and does not schedule a physical downlink shared channel reception. The UE 215 may be expected to provide HARQ-ACK information in response to the request for the Type-3 HARQ-ACK codebook after N symbols from the last symbol of a physical downlink control channel providing the downlink control information format, where the value of N for $\mu=0,1,2$ may be the same value defined for releasing semi-persistent scheduling of a physical downlink shared channel.

According to one or more aspects described herein, the UE 215 may receive a downlink control information via control signaling 210. The UE 215 may receive the downlink control information using two physical downlink control channel candidates. For example, the UE 215 may receive downlink control information based on monitoring at least one of a first physical downlink control channel candidate or a second physical downlink control channel candidate that are linked for physical downlink control channel repetition. In some examples, the second physical downlink control channel candidate may end later in time than the first physical downlink control channel candidate. When the UE 215 detects a downlink control information format using two physical downlink control channel candidates, the downlink control information is of a specific format and does not schedule a physical downlink shared channel, then the UE 215 may transmit feedback 220 in response to detection of the downlink control information format no earlier than a threshold number of symbols (N symbols) after the physical downlink control channel candidate that ends later in time (e.g., second physical downlink control channel candidate). For example, the UE 215 may identify an absence of a scheduled physical downlink shared channel based on the downlink control information. The UE 215 may also determine that the downlink control information is of a specific format. The UE 215 may then transmit the feedback 220 in response to the downlink control information during a time unit that is at least a threshold number of time units after the second physical downlink control channel candidate (or the reference physical downlink control channel candidate or the physical downlink control channel candidate that ends later in time).

In some wireless communications systems, a multiple downlink control information may point to a same slot for feedback transmission. UEs and base stations may provide for physical uplink control channel resource overriding when the most recent downlink control information is received at least a threshold time period before the physical uplink control channel resource indicated by a previous downlink control information. That is, the UE 215 may receive a first downlink control information and a second downlink control information. In some examples, the second downlink control information may override the physical uplink control channel resource indicated by the first downlink control information. The UE 215 may allow the override if the second downlink control information is received before at least a threshold time period before the physical uplink control channel resource indicated by the first downlink control information. A timeline may be defined for physical uplink control channel resource overriding to ensure that canceling the current physical uplink control channel resource and using a new physical uplink control channel resource is not too late with respect to the current physical uplink control channel resource (i.e., the UE 215 has enough time to cancel the first physical uplink control channel resource). Aspects described herein defines a timeline for physical uplink control channel override in cases where the second downlink control information is received using multiple physical downlink control channel candidates.

According to one or more aspects described herein, the UE 215 may determine a first physical uplink control channel resource to transmit a feedback message (e.g., in response to a first downlink control information). As shown in FIG. 2, the first downlink control information may be included in control signaling 210. Alternatively, the first downlink control information may be transmitted separate from the control signaling 210. The UE 215 may then receive a second downlink control information based on monitoring at least one of a first physical downlink control channel candidate or a second physical downlink control channel candidate that are linked for physical downlink control channel repetition. In some examples, the second physical downlink control channel candidate may end later in time than the first physical downlink control channel candidate. Thus, the UE 215 may receive a first downlink control information and may then receive a second downlink control information using two physical downlink control channel candidates. If the second downlink control information is detected using two physical downlink control channel candidates that are linked for physical downlink control channel repetition, then the UE 215 may not expect to multiplex HARQ-ACK information corresponding to the second downlink control information format with HARQ-ACK information corresponding to the first downlink control information format in a physical uplink control channel resource in a slot if the last symbol of the physical downlink control channel candidate that ends later in time (second physical downlink control channel candidate) is not earlier than N3 symbols before the first physical uplink control channel resource. That is, the UE 215 may override the first physical uplink control channel resource based on determining that a time unit associated with the first physical uplink control channel resource is at least a threshold number of time units after the second physical downlink control channel candidate.

Figure 3:
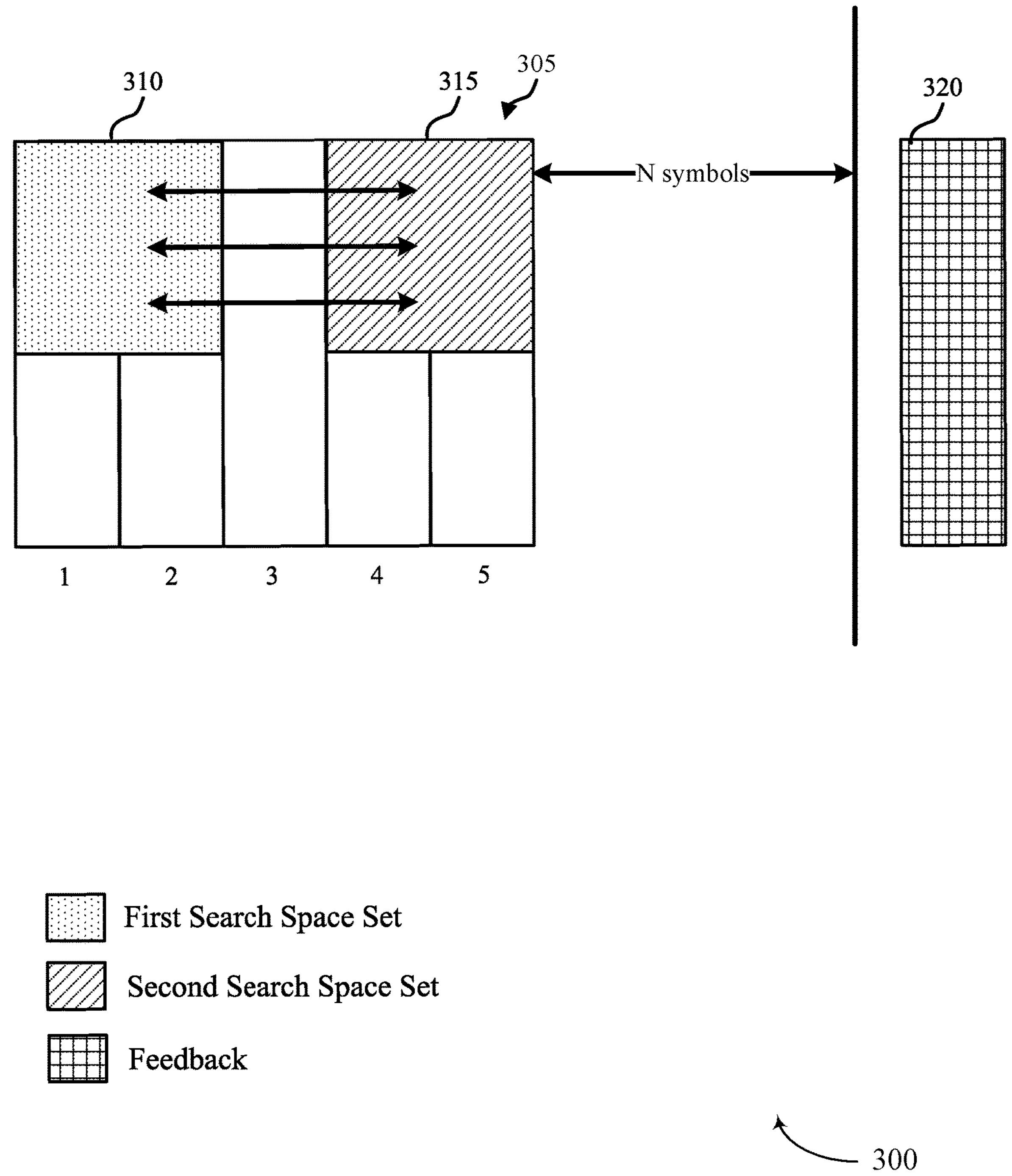
FIG. 3 illustrates an example of a block diagram that supports techniques for downlink control information processing in accordance with aspects of the present disclosure.

FIG. 3 illustrates an example of a block diagram 300 that supports techniques for downlink control information processing in accordance with aspects of the present disclosure. The block diagram 300 may implement various aspects of the wireless communications system 100 or may be implemented by various aspects of the wireless communications system 100, among other examples. The block diagram 300 shows a slot 305. Although 5 symbols are shown in the example of FIG. 3, it may be understood that the slot 305 may include 14 symbols.

The slot 305 may be configured to include a first monitoring occasion 310 of a first search space set and a second monitoring occasion 315 of a second search space set. In the example of FIG. 3, the first monitoring occasion 310 and the second monitoring occasion 315 do not overlap. However, it may be understood that the first monitoring occasion 310 may overlap with the second monitoring occasion 315.

If two search space sets are associated with the same CORESET (e.g., the same resource blocks, same scrambling, and same TCI state), the first monitoring occasion 310 of the first search space set may overlap with the second monitoring occasion 315 of the second search space set. In such cases, a first physical downlink control channel candidate may be mapped to the first search space set and a second physical downlink control channel candidate may be mapped to the second search space set. As shown in the example of FIG. 3, a network node such as a UE may receive downlink control information based on monitoring at least one of a first physical downlink control channel candidate or a second physical downlink control channel candidate for physical downlink control channel repetition. The UE may monitor the first physical downlink control channel candidate mapped to the first monitoring occasion 310 and the second physical downlink control channel candidate mapped to the second monitoring occasion 315. As depicted herein, the second physical downlink control channel candidate ends later in time than the first physical downlink control channel candidate.

As shown in the example of FIG. 3, the first monitoring occasion 310 may include the downlink control information and the second monitoring occasion 315 may include a repetition of the downlink control information. The UE may decode at least one of the first physical downlink control channel candidate or the second physical downlink control channel candidate, where receiving the downlink control information is based on the decoding. Additionally or alternatively, the UE may soft combine a signal associated with the first physical downlink control channel candidate with a signal associated with the second physical downlink control channel candidate. The UE may then decode the soft-combined signal, where receiving the downlink control information is based on the decoding.

According to one or more aspects, the UE may identify that the received downlink control information is not scheduling a physical downlink shared channel transmission. For example, there may be at least three cases where the downlink control information does not schedule a physical downlink shared channel transmission. In such cases, the UE may calculate a time threshold for processing for the downlink control information starting from the last symbol of the downlink control information (to define the earliest time that HARQ-ACK in response to the downlink control information can be transmitted).

When a downlink control information format is detected using two physical downlink control channel candidates that are linked for physical downlink control channel repetition, and the downlink control information format may be 1_0, 1_1, or 1_2 and does not schedule a physical downlink shared channel, the UE may transmit a HARQ-ACK (e.g., feedback 320) in response to detection of the downlink control information format no earlier than N symbols after the last symbol of the physical downlink control channel candidate that ends later in time (which can be defined as the reference physical downlink control channel candidate). That is, the UE may transmit a feedback 320 (e.g., feedback message) in response to the downlink control information during a time unit that is at least a threshold number of time units after the second physical downlink control channel candidate.

In the example of FIG. 3, the first physical downlink control channel candidate is mapped to the first monitoring occasion 310 and the second physical downlink control channel candidate is mapped to the second monitoring occasion 315. The UE may determine that the last symbol of the second physical downlink control channel candidate is symbol 5. In such an example, the UE may determine to transmit the feedback 320 at least N symbols after symbol 5.

In some examples, the downlink control information transmitted using the first physical downlink control channel candidate mapped to the first monitoring occasion 310 and the second physical downlink control channel candidate mapped to the second monitoring occasion 315 may be associated with releasing semi-persistent scheduling of a physical downlink shared channel or indicating secondary cell dormancy without scheduling a physical downlink shared channel, or requesting a Type-3 or one-shot feedback without scheduling a physical downlink shared channel. For example, the UE may determine that the downlink control information is associated with releasing semi-persistent scheduling of a physical downlink shared channel. The UE may then calculate the threshold number of time units based on determining that the downlink control information is associated with releasing semi-persistent scheduling of the physical downlink shared channel and the absence of the scheduled physical downlink shared channel. Additionally or alternatively, the UE may determine that the downlink control information is associated with secondary cell dormancy without scheduling a physical downlink shared channel. The UE may then calculate the threshold number of time units based on determining that the downlink control information is associated with secondary cell dormancy without scheduling the physical downlink shared channel. In some examples, the UE may determine that the downlink control information is associated with requesting one-shot feedback without scheduling a physical downlink shared channel. The UE may then calculate the threshold number of time units based on determining that the downlink control information is associated with requesting one-shot feedback without scheduling the physical downlink shared channel.

As shown in the example of FIG. 3, the value of N symbols may be the same value defined for both releasing semi-persistent scheduling of a physical downlink shared channel and requesting one-shot feedback without scheduling a physical downlink shared channel. The value of N symbols may be different for secondary cell dormancy without scheduling a physical downlink shared channel. Additionally or alternatively, the value of N symbols (or threshold number of time units) may be based on a subcarrier spacing configuration and a UE processing capability (e.g., whether fast timeline or processing Type 2 is supported or enabled for the UE). The timeline of N symbols may define the earliest time that a HARQ-ACK (e.g., feedback 320) may be transmitted by the UE. It may be understood that the HARQ-ACK may be scheduled to be transmitted after N symbols. If HARQ-ACK is scheduled earlier, then the UE may treat that as an error case (not expected by the UE). In some examples, the rule for calculating the threshold number of symbols may be applied irrespective of whether UE detects the downlink control information in one of the linked physical downlink control channel candidates or in both of the linked physical downlink control channel candidates (e.g., when the UE soft combines the signals).

Figure 4:
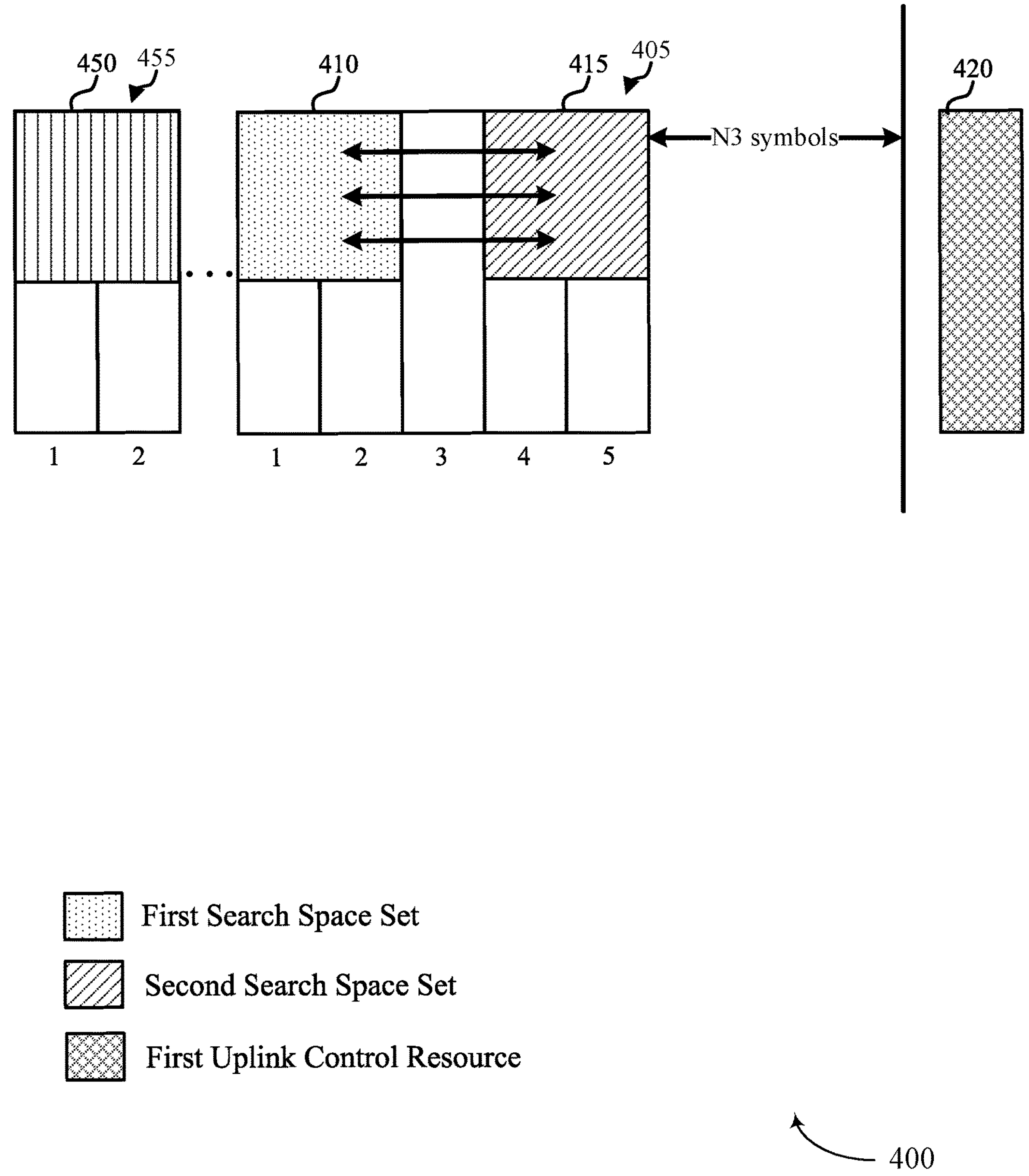
FIG. 4 illustrates an example of a block diagram that supports techniques for downlink control information processing in accordance with aspects of the present disclosure.

FIG. 4 illustrates an example of a block diagram 400 that supports techniques for downlink control information processing in accordance with aspects of the present disclosure. The block diagram 400 may implement various aspects of the wireless communications system 100 or may be implemented by various aspects of the wireless communications system 100, among other examples. The block diagram 400 shows a slot 405 and a slot 455. Although 2 symbols are shown in slot 455 and 5 symbols are shown in slot 405 in the example of FIG. 4, it may be understood that each of the slot 405 and the slot 455 may include 14 symbols.

The slot 455 may include a first downlink control information. The first downlink control information may indicate a first physical uplink control channel resource The slot 405 may include a second downlink control information. Although it is depicted that the first downlink control information and the second downlink control information are received in separate slots, it may be understood that the first downlink control information and the second downlink control information may also be received in the same slot. In particular, the first downlink control information may be received in a slot and the second downlink control information may be received later in time.

The slot 405 may be configured with a first monitoring occasion 410 of a first search space set and a second monitoring occasion 415 of a second search space set. In the example of FIG. 4, the first monitoring occasion 410 and the second monitoring occasion 415 do not overlap. However, it may be understood that the first monitoring occasion 410 may overlap with the second monitoring occasion 415. In some examples, a first physical downlink control channel candidate may be mapped to the first search space set and a second physical downlink control channel candidate may be mapped to the second search space set. As shown in the example of FIG. 4, a network node such as a UE may receive the second downlink control information based on monitoring at least one first physical downlink control channel candidate or a second physical downlink control channel candidate for physical downlink control channel repetition. The UE may monitor the first physical downlink control channel candidate mapped to the first monitoring occasion 410 and the second physical downlink control channel candidate mapped to the second monitoring occasion 415. As depicted herein, the second physical downlink control channel candidate ends later in time than the first physical downlink control channel candidate.

As shown in the example of FIG. 4, the first monitoring occasion 410 may include the second downlink control information and the second monitoring occasion 415 may include a repetition of the second downlink control information. The UE may decode at least one of the first physical downlink control channel candidate or the second physical downlink control channel candidate, where receiving the downlink control information is based on the decoding. Additionally or alternatively, the UE may soft combine a signal associated with the first physical downlink control channel candidate with a signal associated with the second physical downlink control channel candidate. The UE may then decode the soft-combined signal, where receiving the downlink control information is based on the decoding.

In some examples, the UE may determine to override the feedback message to transmit in first physical uplink control channel resource based on determining that a time unit associated with the first physical uplink control channel resource is at least a threshold number of time units after the second physical downlink control channel candidate. The UE may determine to override the feedback message to transmit in the first physical uplink control channel resource with feedback (e.g., another feedback message) multiplexing feedback information in response to the first and to the second downlink control information. In the example of FIG. 4, the UE may determine that the last symbol of the second physical downlink control channel candidate is symbol 5 of slot 405. In such an example, the UE may determine to override the feedback message to transmit in the first physical uplink control channel resource 420 based on determining that a time unit associated with the first physical uplink control channel resource 420 is at least a threshold number of time units (e.g., N3 symbols) after the second physical downlink control channel candidate. That is, the UE may determine to override the first physical uplink control channel resource 420 if the first physical uplink control channel resource 420 is at least N3 symbols after symbol 5. Thus, the timeline (or time threshold) defined for physical uplink control channel resource overriding ensures that canceling the current physical uplink control channel resource transmission and replacing this with a new physical uplink control channel resource transmission (based on a feedback of the second downlink control information) is not too late with respect to the feedback information in response to the first downlink control information. Thus, the UE may override the first physical uplink control channel resource with multiplexed feedback information corresponding to the first and to the second downlink control information.

As depicted in the example of FIG. 4, if the second downlink control information is detected using two physical downlink control channel candidates that are linked for physical downlink control channel repetition, then the UE may not expect to multiplex HARQ-ACK information corresponding to the second downlink control information format with HARQ-ACK information corresponding to the first downlink control information format in the first physical uplink control channel resource in the slot if the last symbol of the physical downlink control channel candidate that ends later in time (e.g., reference physical downlink control channel candidate) is not earlier than N3 symbols before the first physical uplink control channel resource. In some examples, the value of the N3 symbols (or threshold number of time units) may be based on a subcarrier spacing configuration and a UE processing capability. For example, the value of N3 symbols (or threshold number of time units) may be based on whether fast timeline or processing Type 2 is supported or enabled for the UE. In some examples, the rule for calculating the threshold number of symbols may be applied irrespective of whether UE detects the second downlink control information format in one of the linked physical downlink control channel candidates or in both of the linked physical downlink control channel candidates (e.g., when the UE soft combines the signals).

Figure 5:
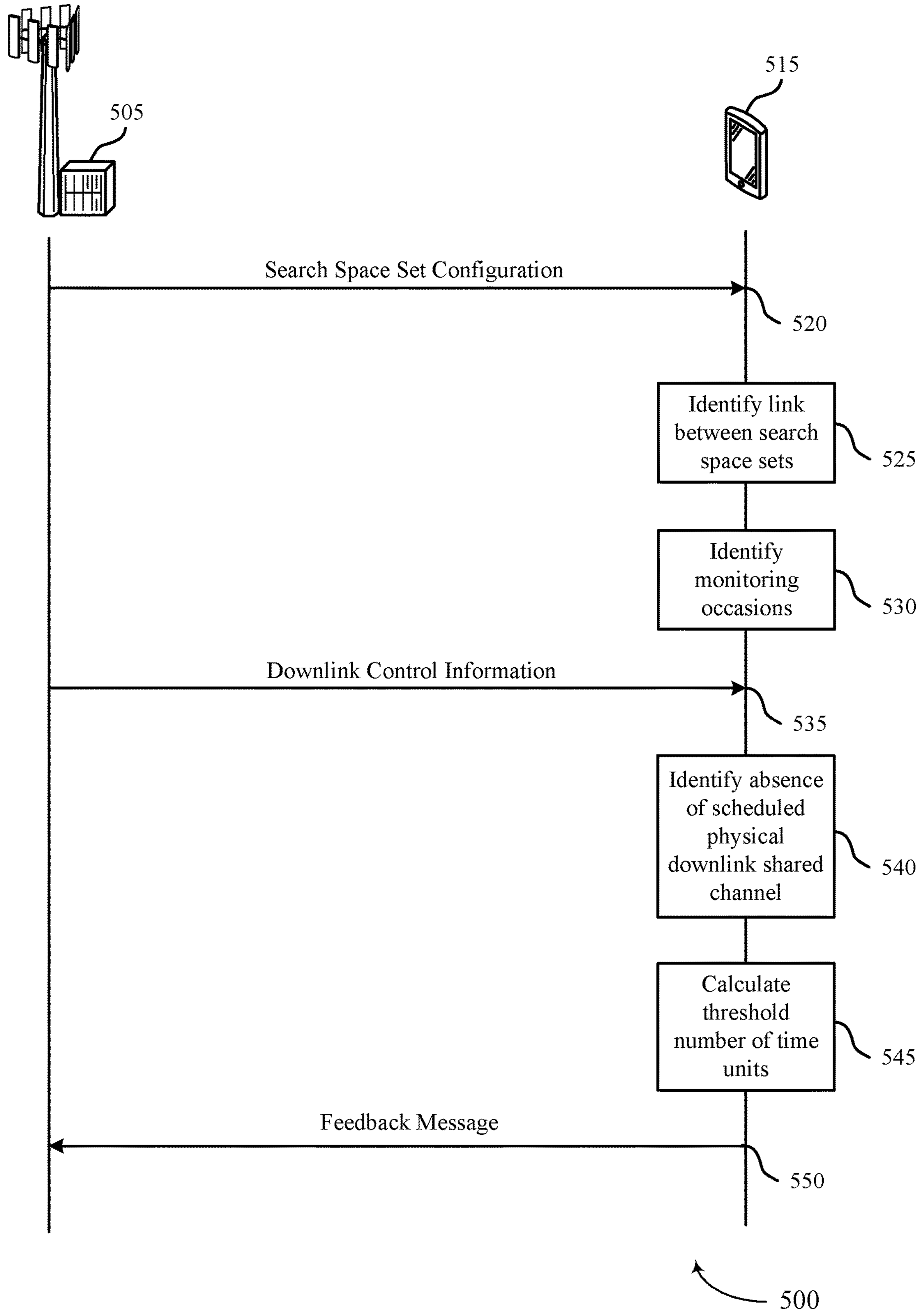
FIG. 5 illustrates an example of a process flow that supports techniques for downlink control information processing in accordance with aspects of the present disclosure.

FIG. 5 illustrates an example of a process flow 500 that supports techniques for downlink control information processing in accordance with aspects of the present disclosure. In some examples, process flow 500 may implement aspects of wireless communications system 100 and wireless communications system 200. A first network node such as a UE 515 may be an example of a UE 115 described with reference to FIGS. 1 and 2 and a second network node such as a base station 505 may be an example of a base station 105 described with reference to FIGS. 1 and 2.

In the following description of the process flow 500, the operations between the base station 505 and the UE 515 may be transmitted in a different order than the exemplary order shown. The operations performed by the base station 505 or the UE 515 may be performed in different orders or at different times than the exemplary order shown. Some operations may also be omitted from the process flow 500, or other operations may be added to the process flow 500. Further, the base station 505 and the UE 515 are not limiting, as the described features may be associated with any number of different devices.

At 520, the UE 515 may receive a search space set configuration. For example. the base station 505 may transmit a configuration of a first search space set and a second search space set. The UE 515 may be configured for two or more search space sets. In some examples, the base station 505 may configure the UE 515 for the search space sets. In other examples, the UE 515 configures itself for the search space sets according to a specification.

At 525, the UE 515 may identify a link between the first search space and the second search space. For example, the UE 515 may identify that the first search space set includes a downlink control information and the second search space set includes a repetition of the downlink control information.

For linking two physical downlink control channel candidates, which may occur within a first monitoring occasion of the first search space set and a second monitoring occasion of the second search space set, one or more of several methods for linking may be used. For example, two physical downlink control channel candidates with the same candidate index across the two search space sets may be linked. In another example, two physical downlink control channel with the same start CCEs may be linked. In other examples, the linking may be explicitly provided as an RRC configuration. The RRC configuration may identify which candidate in a first search space set is linked with which candidate in a second search space set, which may be configured to the UE 515. For example, a candidate index in a search space set may be linked with another candidate index in a second search space set.

At 530, the UE 515 may identify at least a first monitoring occasion in the first search space set to monitor for a first physical downlink control channel candidate and a second monitoring occasion in the second search space set to monitor for a second physical downlink control channel candidate based on the first search space set including the downlink control information and the second search space set including the repetition of the downlink control information. The UE 515 may then monitor the identified one or more monitoring occasions in at least the first search space set or the second search space set.

At 535, the UE 515 may receive downlink control information based on monitoring at least one of a first physical downlink control channel candidate or a second physical downlink control channel candidate that are linked for physical downlink control channel repetition. In some examples, the second physical downlink control channel candidate ends later in time than the first physical downlink control channel candidate. In some examples, the UE 515 may receive the downlink control information based on monitoring the identified one or more monitoring occasions in at least the first search space set or the second search space set.

At 540, the UE 515 may identify an absence of a scheduled physical downlink shared channel based on the downlink control information. At 545, the UE 515 may calculate a threshold number of time units. In some examples, the UE 515 may determine that the downlink control information is associated with releasing semi-persistent scheduling of a physical downlink shared channel. The UE 515 may then calculate the threshold number of time units based on determining that the downlink control information is associated with releasing semi-persistent scheduling of the physical downlink shared channel and the absence of the scheduled physical downlink shared channel.

Additionally or alternatively, the UE 515 may determine that the downlink control information is associated with secondary cell dormancy without scheduling a physical downlink shared channel. In such cases, the UE 515 may calculate the threshold number of time units based on determining that the downlink control information is associated with secondary cell dormancy without scheduling the physical downlink shared channel. Additionally or alternatively, the UE 515 may determine that the downlink control information is associated with requesting one-shot feedback without scheduling a physical downlink shared channel. In such cases, the UE 515 may calculate the threshold number of time units based on determining that the downlink control information is associated with requesting one-shot feedback without scheduling the physical downlink shared channel.

At 550, the UE 515 may transmit, to the base station 505, a feedback message in response to the downlink control information during a time unit that is at least the threshold number of time units after the second physical downlink control channel candidate. Although not shown in the example of FIG. 5, it may be understood that the base station 505 may identify a set of resources for feedback transmission during a time unit at least a threshold number of time units after the second physical downlink control channel candidate based on the downlink control information not scheduling a physical downlink shared channel.

Figure 6:
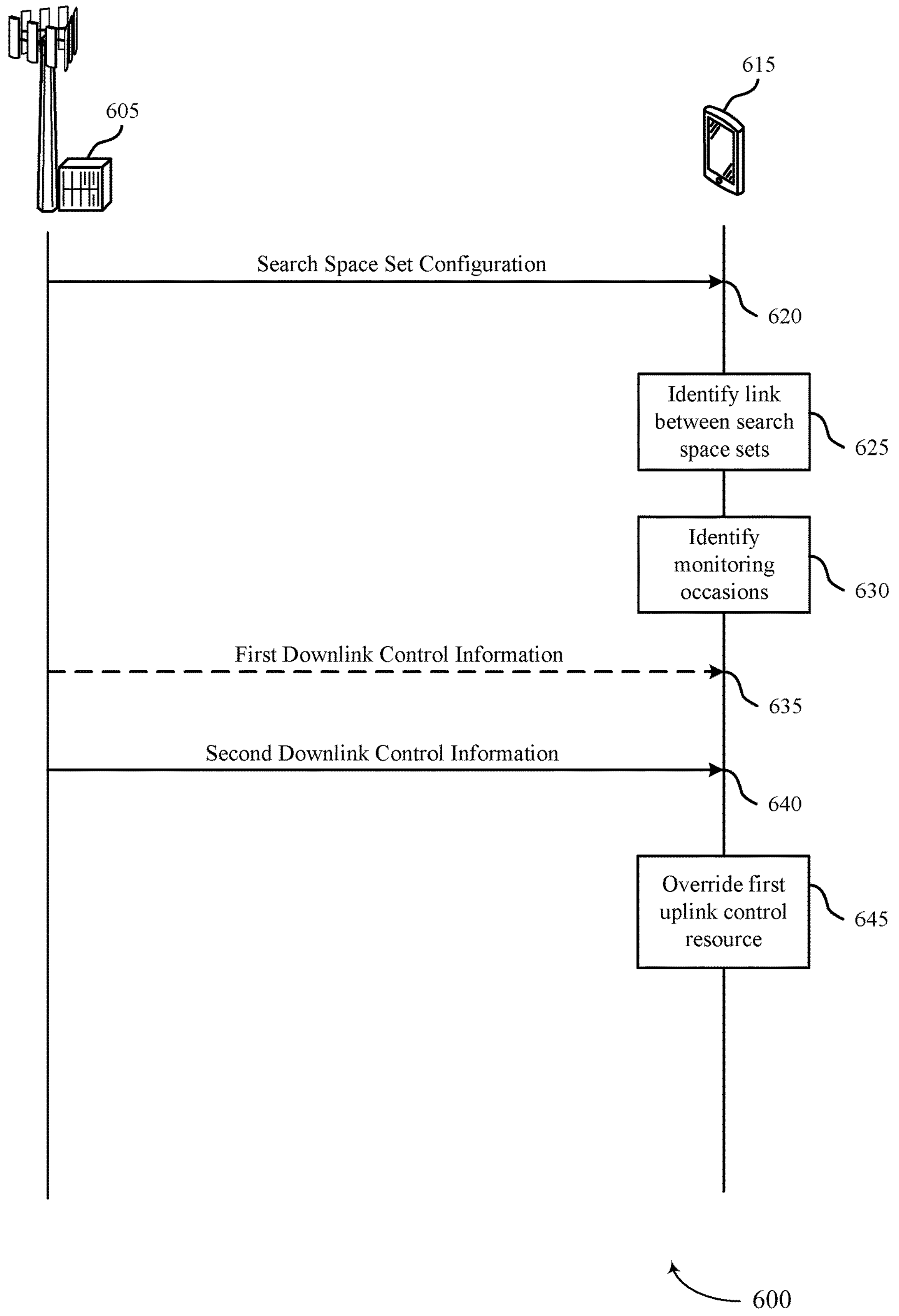
FIG. 6 illustrates an example of a process flow that supports techniques for downlink control information processing in accordance with aspects of the present disclosure.

FIG. 6 illustrates an example of a process flow 600 that supports techniques for downlink control information processing in accordance with aspects of the present disclosure. In some examples, process flow 600 may implement aspects of wireless communications system 100 and wireless communications system 200. A first network node such as a UE 615 may be an example of a UE 115 described with reference to FIGS. 1 and 2 and a second network node such as a base station 605 may be an example of a base station 105 described with reference to FIGS. 1 and 2.

In the following description of the process flow 600, the operations between the base station 605 and the UE 615 may be transmitted in a different order than the exemplary order shown. The operations performed by the base station 605 or the UE 615 may be performed in different orders or at different times than the exemplary order shown. Some operations may also be omitted from the process flow 600, or other operations may be added to the process flow 600. Further, the base station 605 and the UE 615 are not limiting, as the described features may be associated with any number of different devices.

At 620, the UE 615 may receive a search space set configuration. For example. the base station 605 may transmit a configuration of a first search space set and a second search space set. The UE 615 may be configured for two or more search space sets. In some examples, the base station 605 may configure the UE 615 for the search space sets. In other examples, the UE 615 configures itself for the search space sets according to a specification.

At 625, the UE 615 may identify a link between the first search space and the second search space. For example, the UE 615 may identify that the first search space set includes a downlink control information and the second search space set includes a repetition of the downlink control information.

At 630, the UE 615 may identify at least a first monitoring occasion in the first search space set to monitor for a first physical downlink control channel candidate and a second monitoring occasion in the second search space set to monitor for a second physical downlink control channel candidate based on the first search space set including the downlink control information and the second search space set including the repetition of the downlink control information. The UE 615 may then monitor the identified one or more monitoring occasions in at least the first search space set or the second search space set.

At 635, the UE 615 may optionally receive a first downlink control information. The UE 615 may identify a first physical uplink control channel resource for transmitting a feedback message based on the first downlink control information. In some examples, the first physical uplink control channel resource may be associated with a semi-persistent scheduling physical downlink shared channel release.

At 640, the UE 615 may receive a second downlink control information based on monitoring at least one of a first physical downlink control channel candidate or a second physical downlink control channel candidate that are linked for physical downlink control channel repetition. In some examples, the second physical downlink control channel candidate ends later in time than the first physical downlink control channel candidate. In some examples, the UE 615 may receive the downlink control information based on monitoring the identified one or more monitoring occasions in at least the first search space set or the second search space set. In some examples, the UE 615 may determine that the second physical downlink control channel candidate spans a time period ending in a second time unit.

At 645, the UE 615 may override the feedback message to transmit in the first physical uplink control channel resource based on determining that a time unit associated with the first physical uplink control channel resource is at least a threshold number of time units after the second physical downlink control channel candidate. In some examples, the UE 615 may override the feedback message to transmit in the first physical uplink control channel resource based on determining that the time unit associated with the first physical uplink control channel resource is scheduled at least the threshold number of time units after the second time unit.

Figure 7:
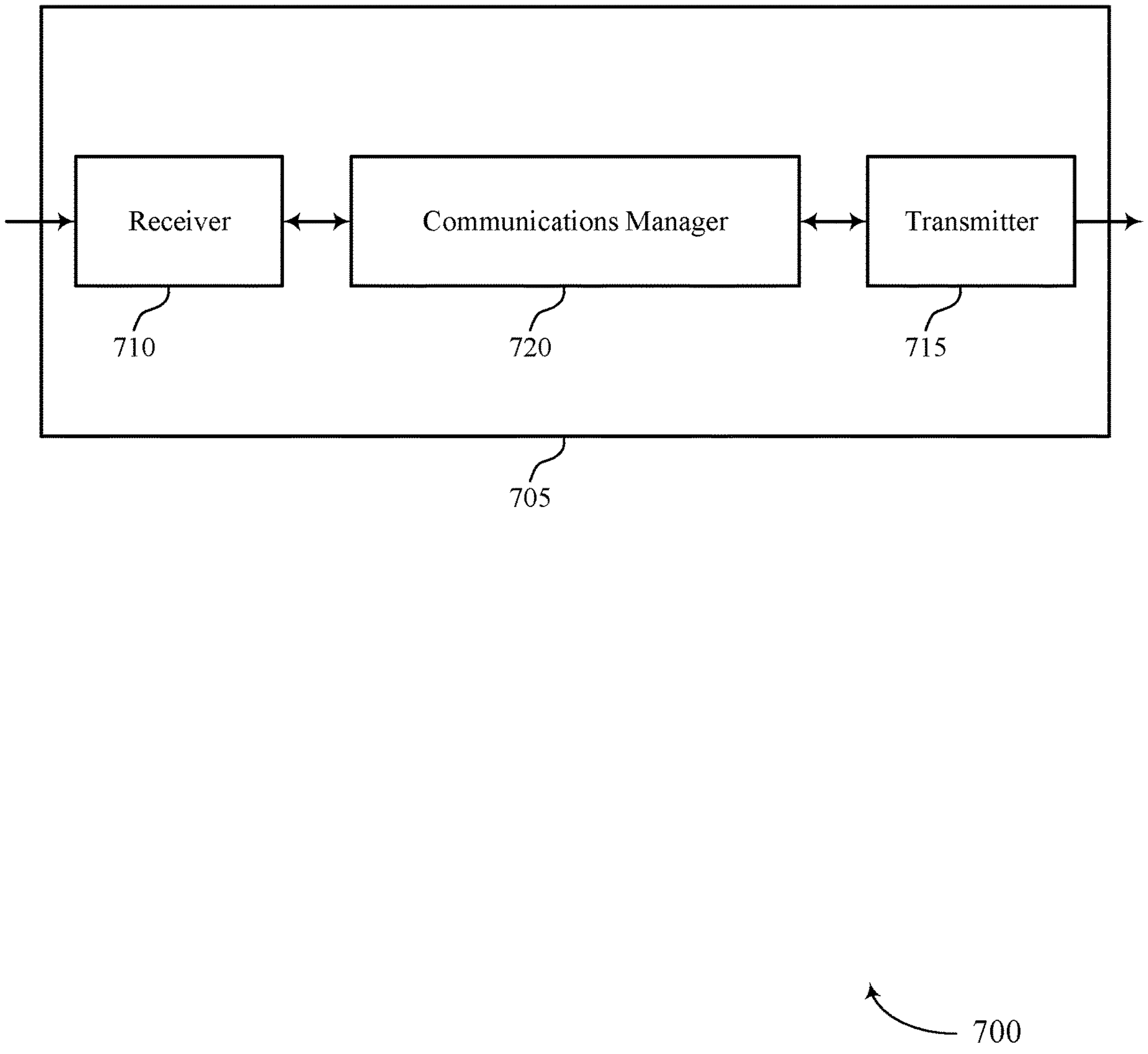
FIGS. 7 and 8 show block diagrams of devices that support techniques for downlink control information processing in accordance with aspects of the present disclosure.

FIG. 7 shows a block diagram 700 of a device 705 that supports techniques for downlink control information processing in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for downlink control information processing). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for downlink control information processing). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for downlink control information processing as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may be associated with a first network node and may support wireless communication at a UE in accordance with examples as disclosed herein. For example, the communications manager 720 may be configured as or otherwise support a means for receiving, from a base station, downlink control information based on monitoring at least one of a first physical downlink control channel candidate or a second physical downlink control channel candidate that are linked for physical downlink control channel repetition, where the second physical downlink control channel candidate ends later in time than the first physical downlink control channel candidate. The communications manager 720 may be configured as or otherwise support a means for identifying an absence of a scheduled physical downlink shared channel based on the downlink control information. The communications manager 720 may be configured as or otherwise support a means for transmitting, to the base station, a feedback message in response to the downlink control information at least a threshold number of time units after the second physical downlink control channel candidate.

Additionally or alternatively, the communications manager 720 may support wireless communication at a UE in accordance with examples as disclosed herein. For example, the communications manager 720 may be configured as or otherwise support a means for determining a first physical uplink control channel resource for transmitting a feedback message. The communications manager 720 may be configured as or otherwise support a means for receiving, from a base station, a downlink control information based on monitoring at least one of a first physical downlink control channel candidate or a second physical downlink control channel candidate that are linked for physical downlink control channel repetition, where the second physical downlink control channel candidate ends later in time than the first physical downlink control channel candidate. The communications manager 720 may be configured as or otherwise support a means for overriding the first feedback message to transmit in the first physical uplink control channel resource based on determining that the first physical uplink control channel resource is at least a threshold number of time units after the second physical downlink control channel candidate.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, more efficient utilization of communication resources.

Figure 8:
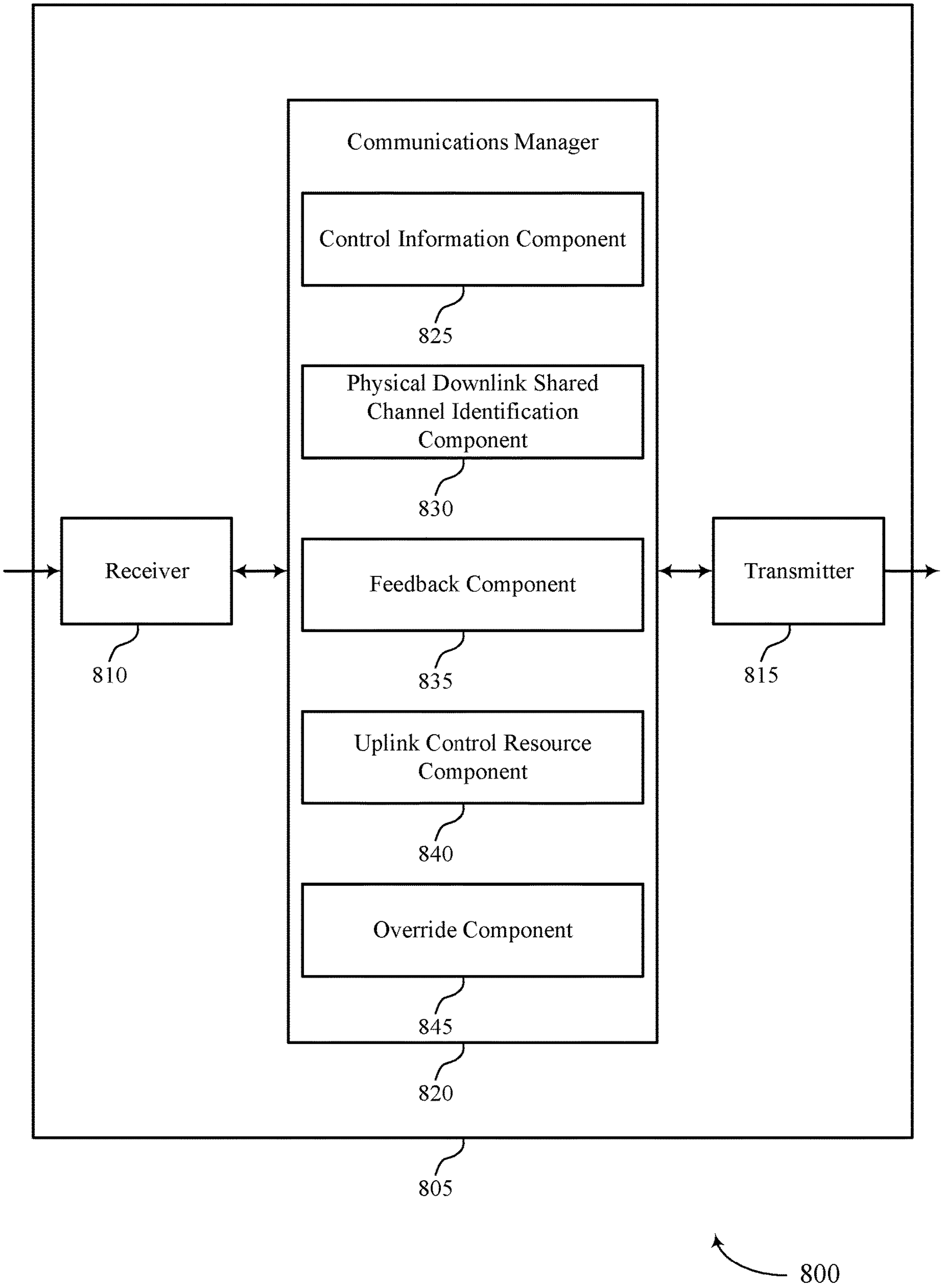

FIG. 8 shows a block diagram 800 of a device 805 that supports techniques for downlink control information processing in accordance with aspects of the present disclosure. The device 805 may be an example of aspects of a device 705 or a UE 115, or a first network node as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for downlink control information processing). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for downlink control information processing). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for downlink control information processing as described herein. For example, the communications manager 820 may include a control information component 825, a physical downlink shared channel identification component 830, a feedback component 835, an uplink control resource component 840, an override component 845, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may be associated with a first network node and may support wireless communication at a UE in accordance with examples as disclosed herein. The control information component 825 may be configured as or otherwise support a means for receiving, from a second network node, downlink control information based on monitoring at least one of a first physical downlink control channel candidate or a second physical downlink control channel candidate that are linked for physical downlink control channel repetition, where the second physical downlink control channel candidate ends later in time than the first physical downlink control channel candidate. The physical downlink shared channel identification component 830 may be configured as or otherwise support a means for identifying an absence of a scheduled physical downlink shared channel based on the downlink control information. The feedback component 835 may be configured as or otherwise support a means for transmitting, to the base station, a feedback message in response to the downlink control information at least a threshold number of time units after the second physical downlink control channel candidate.

Additionally or alternatively, the communications manager 820 may be associated with a first network node and may support wireless communication at a UE in accordance with examples as disclosed herein. The uplink control resource component 840 may be configured as or otherwise support a means for determining a first physical uplink control channel resource for transmitting a feedback message. The control information component 825 may be configured as or otherwise support a means for receiving, from a base station, a downlink control information based on monitoring at least one of a first physical downlink control channel candidate or a second physical downlink control channel candidate that are linked for physical downlink control channel repetition, where the second physical downlink control channel candidate ends later in time than the first physical downlink control channel candidate. The override component 845 may be configured as or otherwise support a means for overriding the first feedback message to transmit in the first physical uplink control channel resource based on the first physical uplink control channel resource being at least the threshold number of time units after the first time unit.

Figure 9:
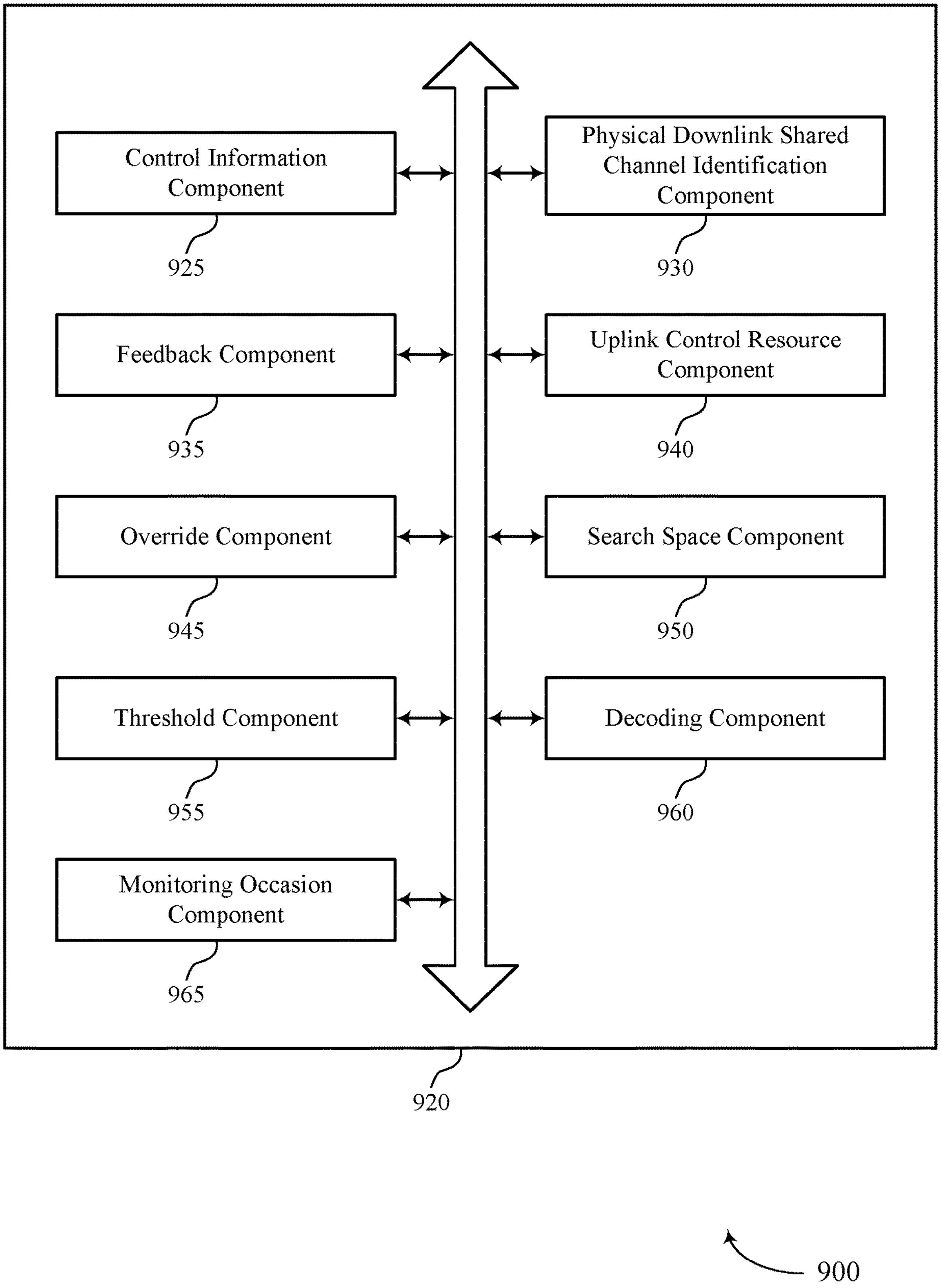
FIG. 9 shows a block diagram of a communications manager that supports techniques for downlink control information processing in accordance with aspects of the present disclosure.

FIG. 9 shows a block diagram 900 of a communications manager 920 that supports techniques for downlink control information processing in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for downlink control information processing as described herein. For example, the communications manager 920 may include a control information component 925, a physical downlink shared channel identification component 930, a feedback component 935, an uplink control resource component 940, an override component 945, a search space component 950, a threshold component 955, a decoding component 960, a monitoring occasion component 965, or any combination thereof. Each of these components may communicate, directly or indirectly, with one another (e.g., via one or more buses).

The communications manager 920 may support wireless communication at a UE in accordance with examples as disclosed herein. The control information component 925 may be configured as or otherwise support a means for receiving, from a base station, downlink control information based on monitoring at least one of a first physical downlink control channel candidate or a second physical downlink control channel candidate that are linked for physical downlink control channel repetition, where the second physical downlink control channel candidate ends later in time than the first physical downlink control channel candidate.

The physical downlink shared channel identification component 930 may be configured as or otherwise support a means for identifying an absence of a scheduled physical downlink shared channel based on the downlink control information. The feedback component 935 may be configured as or otherwise support a means for transmitting, to the base station, a feedback message in response to the downlink control information at least a threshold number of time units after the second physical downlink control channel candidate.

In some examples, the feedback component 935 may be configured as or otherwise support a means for determining that the second physical downlink control channel candidate spans a time period ending in a first time unit, where transmitting the feedback message includes transmitting the feedback message at least the threshold number of time units after the first time unit.

In some examples, the search space component 950 may be configured as or otherwise support a means for receiving a configuration of a first search space set and a second search space set. In some examples, the search space component 950 may be configured as or otherwise support a means for identifying that the first search space set includes the downlink control information and the second search space set includes a repetition of the downlink control information. In some examples, receiving the downlink control information may be based on the first search space set including the downlink control information and the second search space set including the repetition of the downlink control information.

In some examples, the monitoring occasion component 965 may be configured as or otherwise support a means for identifying at least a first monitoring occasion in the first search space set to monitor for the first physical downlink control channel candidate and a second monitoring occasion in the second search space set to monitor for the second physical downlink control channel candidate based on the first search space set including the downlink control information and the second search space set including the repetition of the downlink control information. In some examples, the monitoring occasion component 965 may be configured as or otherwise support a means for monitoring at least one of the first monitoring occasion or the second monitoring occasion, where receiving the downlink control information is based on the monitoring.

In some examples, the control information component 925 may be configured as or otherwise support a means for determining that the downlink control information is associated with releasing semi-persistent scheduling of a physical downlink shared channel. In some examples, the threshold component 955 may be configured as or otherwise support a means for calculating the threshold number of time units based on determining that the downlink control information is associated with releasing semi-persistent scheduling of the physical downlink shared channel, where transmitting the feedback message includes transmitting the feedback message at least the calculated threshold number of time units after the second physical downlink control channel candidate.

In some examples, the control information component 925 may be configured as or otherwise support a means for determining that the downlink control information is associated with secondary cell dormancy without scheduling a physical downlink shared channel. In some examples, the threshold component 955 may be configured as or otherwise support a means for calculating the threshold number of time units based on determining that the downlink control information is associated with secondary cell dormancy without scheduling the physical downlink shared channel, where transmitting the feedback message includes transmitting the feedback message at least the calculated threshold number of time units after the second physical downlink control channel candidate.

In some examples, the control information component 925 may be configured as or otherwise support a means for determining that the downlink control information is associated with requesting one-shot feedback without scheduling a physical downlink shared channel. In some examples, the threshold component 955 may be configured as or otherwise support a means for calculating the threshold number of time units based on determining that the downlink control information is associated with requesting one-shot feedback without scheduling the physical downlink shared channel, where transmitting the feedback message includes transmitting the feedback message at least the calculated threshold number of time units after the second physical downlink control channel candidate.

In some examples, the decoding component 960 may be configured as or otherwise support a means for decoding at least one of the first physical downlink control channel candidate or the second physical downlink control channel candidate, where receiving the downlink control information is based on the decoding. In some examples, the set of time and frequency resources is at least the threshold number of time units after the second physical downlink control channel candidate.

In some examples, the decoding component 960 may be configured as or otherwise support a means for soft combining a signal associated with the first physical downlink control channel candidate with a signal associated with the second physical downlink control channel candidate. In some examples, the decoding component 960 may be configured as or otherwise support a means for decoding the soft-combined signal, where receiving the downlink control information is based on the decoding.

In some examples, the decoding component 960 may be configured as or otherwise support a means for decoding at least one of the first physical downlink control channel candidate or the second physical downlink control channel candidate. In some examples, the feedback component 935 may be configured as or otherwise support a means for identifying a set of time and frequency resources that is for transmitting the feedback message based on the decoding, where the set of time and frequency resources is scheduled at least the threshold number of time units after the second physical downlink control channel candidate.

In some examples, transmitting the feedback message includes transmitting the feedback message during the identified set of time and frequency resources. In some examples, the threshold number of time units is based on a subcarrier spacing configuration and a processing capability.

Additionally or alternatively, the communications manager 920 may support wireless communication at a UE in accordance with examples as disclosed herein. The uplink control resource component 940 may be configured as or otherwise support a means for determining a first physical uplink control channel resource for transmitting a feedback message. In some examples, the control information component 925 may be configured as or otherwise support a means for receiving, from a base station, a downlink control information based on monitoring at least one of a first physical downlink control channel candidate or a second physical downlink control channel candidate that are linked for physical downlink control channel repetition, where the second physical downlink control channel candidate ends later in time than the first physical downlink control channel candidate.

The override component 945 may be configured as or otherwise support a means for overriding the first feedback message to transmit in the first physical uplink control channel resource based on determining that the first physical uplink control channel resource is at least a threshold number of time units after the second physical downlink control channel candidate.

In some examples, the override component 945 may be configured as or otherwise support a means for determining that the second physical downlink control channel candidate spans a time period ending in a first time unit, where overriding the feedback message to transmit in the first physical uplink control channel resource includes overriding the first feedback message to transmit in the first physical uplink control channel resource based on determining that the time unit associated with the first physical uplink control channel resource is scheduled at least the threshold number of time units after the first time unit.

In some examples, the control information component 925 may be configured as or otherwise support a means for determining that the downlink control information indicates a second physical uplink control channel resource for a physical uplink control channel transmission with a second feedback message. In some examples, the feedback component 935 may be configured as or otherwise support a means for transmitting the first feedback message and the second feedback message using the second physical uplink control channel resource based on the first physical uplink control channel resource being at least the threshold number of time units after the second physical downlink control channel candidate.

In some examples, the search space component 950 may be configured as or otherwise support a means for receiving a configuration of a first search space set and a second search space set. In some examples, the search space component 950 may be configured as or otherwise support a means for identifying that the first search space set includes the downlink control information and the second search space set includes a repetition of the downlink control information, where receiving the downlink control information is based on the first search space set including the downlink control information and the second search space set including the repetition of the downlink control information.

In some examples, the monitoring occasion component 965 may be configured as or otherwise support a means for identifying at least a first monitoring occasion in the first search space set to monitor for the first physical downlink control channel candidate and a second monitoring occasion in the second search space set to monitor for the second physical downlink control channel candidate based on the first search space set including the downlink control information and the second search space set including the repetition of the downlink control information. In some examples, the monitoring occasion component 965 may be configured as or otherwise support a means for monitoring at least one of the first monitoring occasion or the second monitoring occasion, where receiving the downlink control information is based on the monitoring.

In some examples, the decoding component 960 may be configured as or otherwise support a means for decoding at least one of the first physical downlink control channel candidate or the second physical downlink control channel candidate, where receiving the downlink control information is based on the decoding.

In some examples, the decoding component 960 may be configured as or otherwise support a means for soft combining a signal associated with the first physical downlink control channel candidate with a signal associated with the second physical downlink control channel candidate. In some examples, the decoding component 960 may be configured as or otherwise support a means for decoding the soft-combined signal, where receiving the downlink control information is based on the decoding.

In some examples, the control information component 925 may be configured as or otherwise support a means for receiving, from the base station, a second downlink control information indicating the first physical uplink control channel resource, where the downlink control information is received later than the second downlink control information.

In some examples, the first physical uplink control channel resource is associated with a semi-persistent scheduling physical downlink shared channel release. In some examples, the threshold number of time units is based on a subcarrier spacing configuration and a processing capability.

Figure 10:
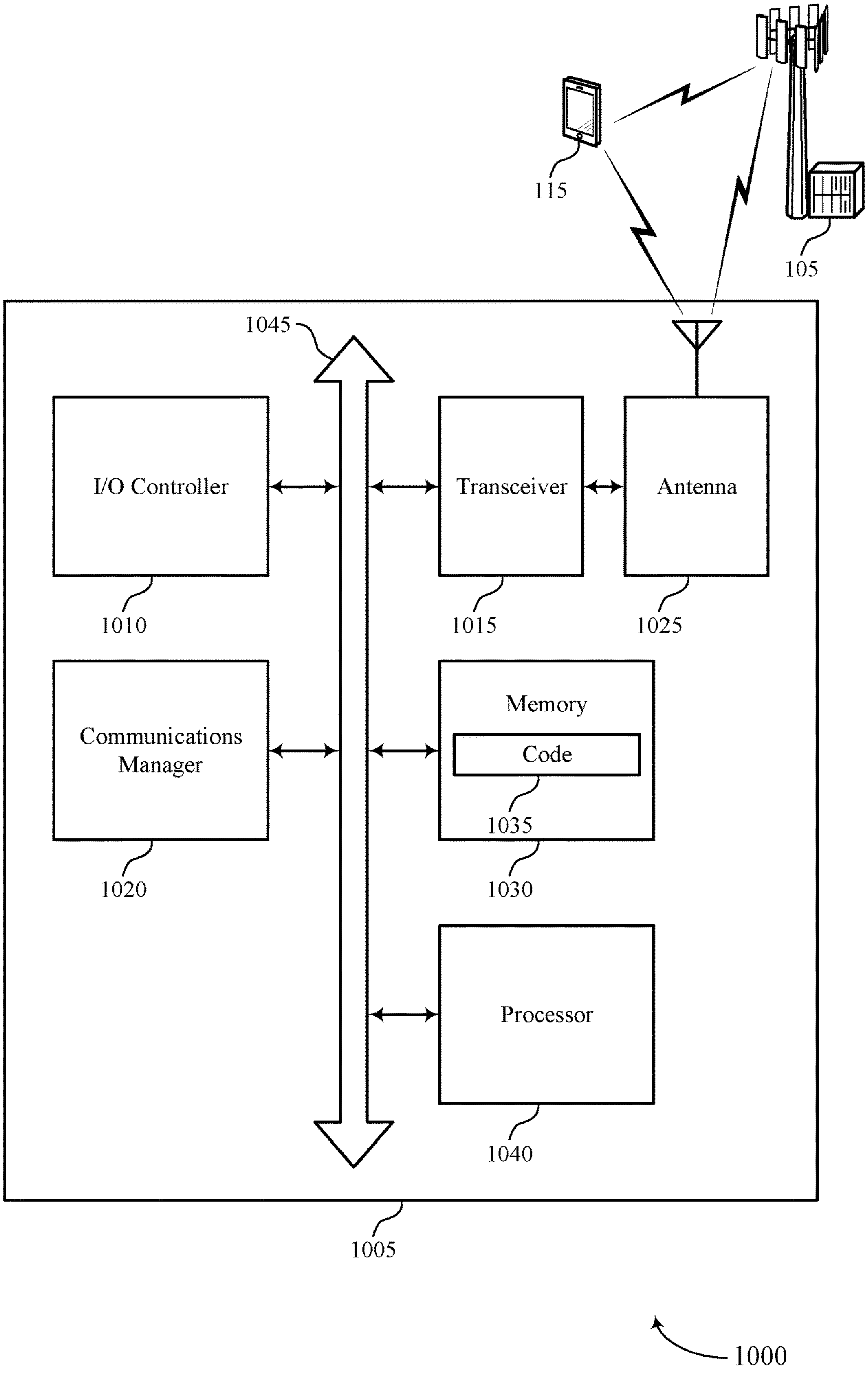
FIG. 10 shows a diagram of a system including a device that supports techniques for downlink control information processing in accordance with aspects of the present disclosure.

FIG. 10 shows a diagram of a system 1000 including a device 1005 that supports techniques for downlink control information processing in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for downlink control information processing). For example, the device 1005 or a component of the device 1005 may include a processor 1040 and memory 1030 coupled to the processor 1040, the processor 1040 and memory 1030 configured to perform various functions described herein.

The communications manager 1020 may be associated with a first network node and may support wireless communication at a UE in accordance with examples as disclosed herein. For example, the communications manager 1020 may be configured as or otherwise support a means for receiving, from a base station, downlink control information based on monitoring at least one of a first physical downlink control channel candidate or a second physical downlink control channel candidate that are linked for physical downlink control channel repetition, where the second physical downlink control channel candidate ends later in time than the first physical downlink control channel candidate. The communications manager 1020 may be configured as or otherwise support a means for identifying an absence of a scheduled physical downlink shared channel based on the downlink control information. The communications manager 1020 may be configured as or otherwise support a means for transmitting, to the base station, a feedback message in response to the downlink control information at least a threshold number of time units after the second physical downlink control channel candidate.

Additionally or alternatively, the communications manager 1020 may support wireless communication at a UE in accordance with examples as disclosed herein. For example, the communications manager 1020 may be configured as or otherwise support a means for determining a first physical uplink control channel resource for transmitting a feedback message. The communications manager 1020 may be configured as or otherwise support a means for receiving, from a base station, a downlink control information based on monitoring at least one of a first physical downlink control channel candidate or a second physical downlink control channel candidate that are linked for physical downlink control channel repetition, where the second physical downlink control channel candidate ends later in time than the first physical downlink control channel candidate. The communications manager 1020 may be configured as or otherwise support a means for overriding the first feedback message to transmit in the first physical uplink control channel resource based on determining that the first physical uplink control channel resource is at least a threshold number of time units after the second physical downlink control channel candidate.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for downlink control information processing as described herein, or the processor 1040 and the memory 1030 may be otherwise configured to perform or support such operations.

Figure 11:
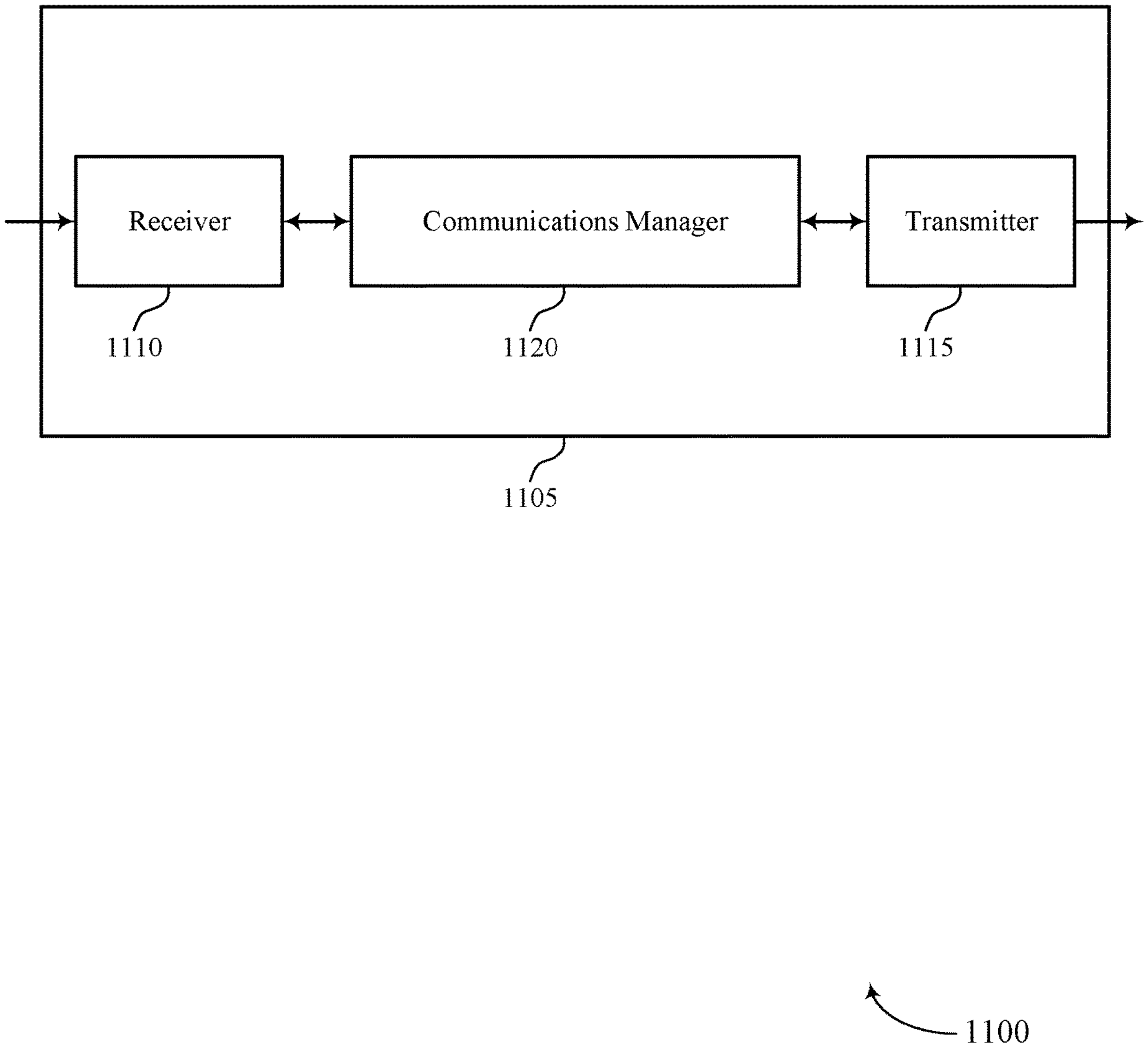
FIGS. 11 and 12 show block diagrams of devices that support techniques for downlink control information processing in accordance with aspects of the present disclosure.

FIG. 11 shows a block diagram 1100 of a device 1105 that supports techniques for downlink control information processing in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for downlink control information processing). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for downlink control information processing). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for downlink control information processing as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may be associated with a first network node and may support wireless communication at a base station in accordance with examples as disclosed herein. For example, the communications manager 1120 may be configured as or otherwise support a means for transmitting, to a UE, downlink control information using a first physical downlink control channel candidate and a second physical downlink control channel candidate that are linked for physical downlink control channel repetition, where the second physical downlink control channel candidate ends later in time than the first physical downlink control channel candidate. The communications manager 1120 may be configured as or otherwise support a means for identifying a set of resources for feedback transmission during a time unit at least a threshold number of time units after the second physical downlink control channel candidate based on the downlink control information not scheduling a physical downlink shared channel. The communications manager 1120 may be configured as or otherwise support a means for receiving, from the UE, a feedback message in response to the downlink control information at least a threshold number of time units after the second physical downlink control channel candidate.

Additionally or alternatively, the communications manager 1120 may support wireless communication at a base station in accordance with examples as disclosed herein. For example, the communications manager 1120 may be configured as or otherwise support a means for scheduling a first physical uplink control channel resource for transmitting, by a UE, a first feedback message. The communications manager 1120 may be configured as or otherwise support a means for transmitting, to the UE, a downlink control information using a first physical downlink control channel candidate and a second physical downlink control channel candidate that are linked for physical downlink control channel repetition, where the second physical downlink control channel candidate ends later in time than the first physical downlink control channel candidate. The communications manager 1120 may be configured as or otherwise support a means for determining whether the first physical uplink control channel resource during a time unit at least a threshold number of time units after the second physical downlink control channel candidate. The communications manager 1120 may be configured as or otherwise support a means for determining that the feedback message is to be overridden based on determining that the time unit being at least the threshold number of time units after the second physical downlink control channel candidate.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption, more efficient utilization of communication resources.

Figure 12:
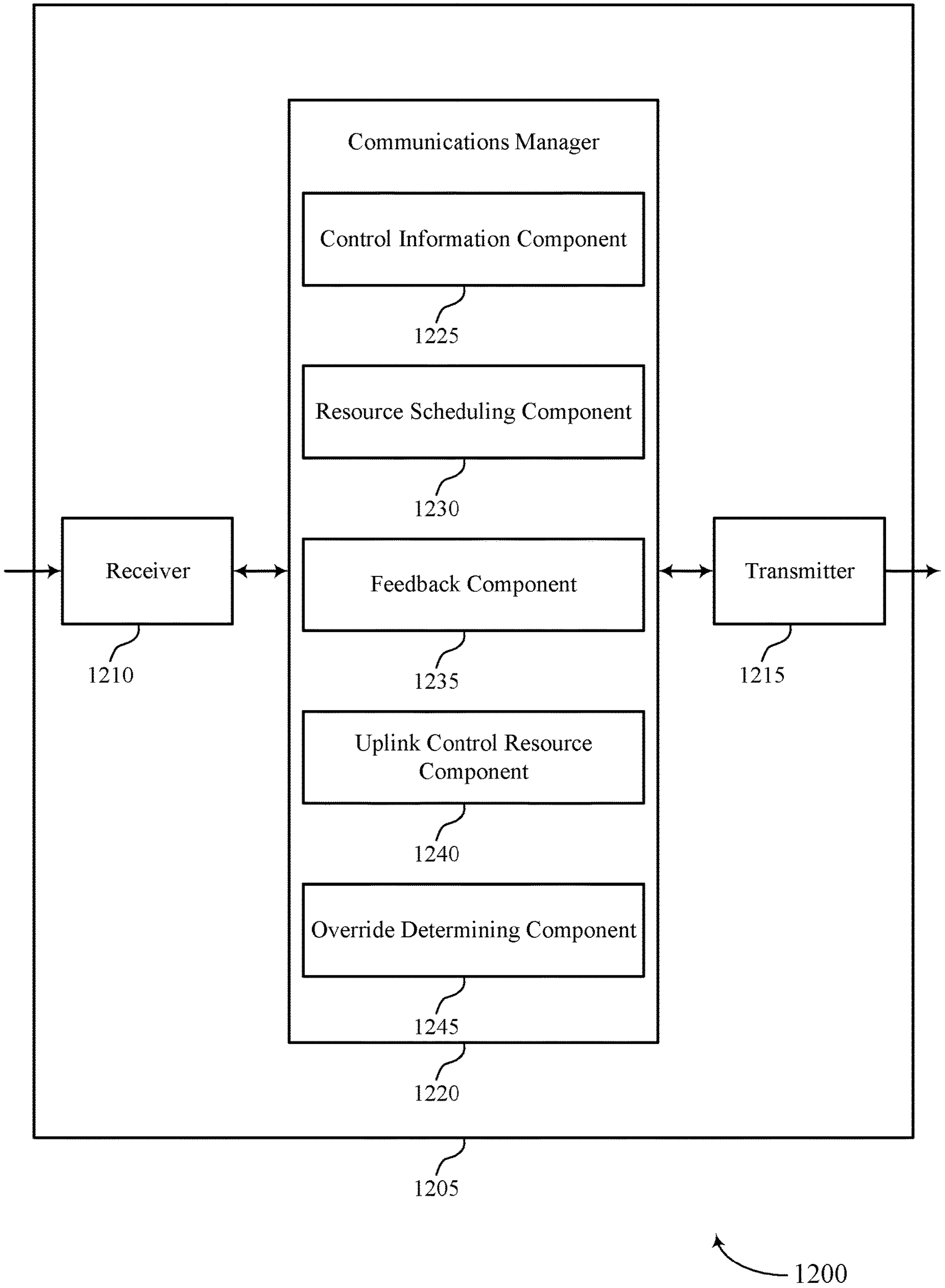

FIG. 12 shows a block diagram 1200 of a device 1205 that supports techniques for downlink control information processing in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for downlink control information processing). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for downlink control information processing). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for downlink control information processing as described herein. For example, the communications manager 1220 may include a control information component 1225, a resource scheduling component 1230, a feedback component 1235, an uplink control resource component 1240, an override determining component 1245, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may be associated with a first network node and may support wireless communication at a base station in accordance with examples as disclosed herein. The control information component 1225 may be configured as or otherwise support a means for transmitting, to a UE, downlink control information using a first physical downlink control channel candidate and a second physical downlink control channel candidate that are linked for physical downlink control channel repetition, where the second physical downlink control channel candidate ends later in time than the first physical downlink control channel candidate.

The resource scheduling component 1230 may be configured as or otherwise support a means for identifying a set of resources for feedback transmission during a time unit at least a threshold number of time units after the second physical downlink control channel candidate based on the downlink control information not scheduling a physical downlink shared channel. The feedback component 1235 may be configured as or otherwise support a means for receiving, from the UE, a feedback message in response to the downlink control information at least a threshold number of time units after the second physical downlink control channel candidate.

Additionally or alternatively, the communications manager 1220 may support wireless communication at a base station in accordance with examples as disclosed herein. The uplink control resource component 1240 may be configured as or otherwise support a means for scheduling a first physical uplink control channel resource for transmitting, by a UE, a first feedback message. The control information component 1225 may be configured as or otherwise support a means for transmitting, to the UE, a downlink control information using a first physical downlink control channel candidate and a second physical downlink control channel candidate that are linked for physical downlink control channel repetition, where the second physical downlink control channel candidate ends later in time than the first physical downlink control channel candidate.

The resource scheduling component 1230 may be configured as or otherwise support a means for determining whether the first physical uplink control channel resource during a time unit at least a threshold number of time units after the second physical downlink control channel candidate. The override determining component 1245 may be configured as or otherwise support a means for determining that the feedback message is to be overridden based on determining that the time unit being at least the threshold number of time units after the second physical downlink control channel candidate.

Figure 13:
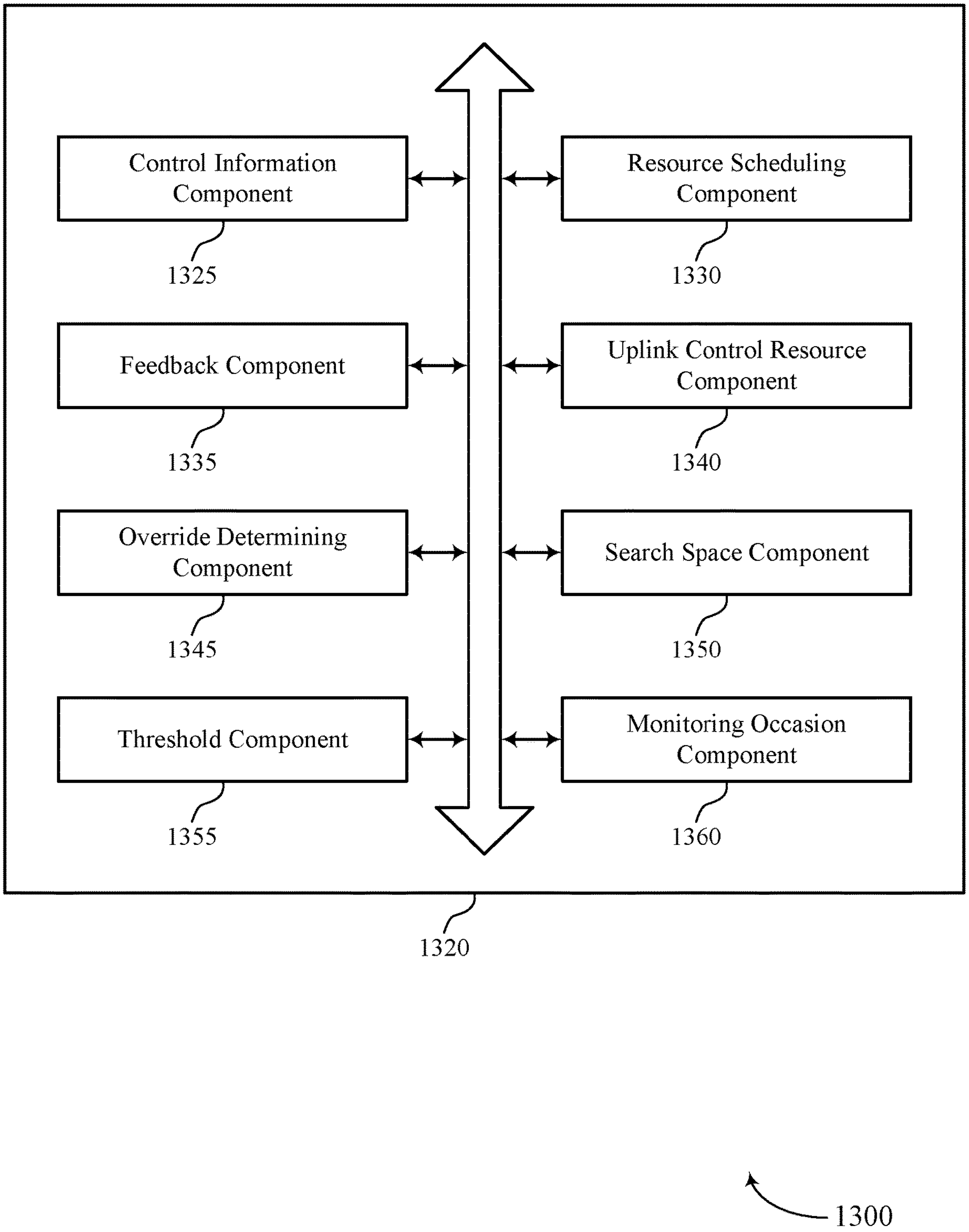
FIG. 13 shows a block diagram of a communications manager that supports techniques for downlink control information processing in accordance with aspects of the present disclosure.

FIG. 13 shows a block diagram 1300 of a communications manager 1320 that supports techniques for downlink control information processing in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for downlink control information processing as described herein. For example, the communications manager 1320 may include a control information component 1325, a resource scheduling component 1330, a feedback component 1335, an uplink control resource component 1340, an override determining component 1345, a search space component 1350, a threshold component 1355, a monitoring occasion component 1360, or any combination thereof. Each of these components may communicate, directly or indirectly, with one another (e.g., via one or more buses).

The communications manager 1320 may be associated with a first network node and may support wireless communication at a base station in accordance with examples as disclosed herein. The control information component 1325 may be configured as or otherwise support a means for transmitting, to a UE, downlink control information using a first physical downlink control channel candidate and a second physical downlink control channel candidate that are linked for physical downlink control channel repetition, where the second physical downlink control channel candidate ends later in time than the first physical downlink control channel candidate. The resource scheduling component 1330 may be configured as or otherwise support a means for identifying a set of resources for feedback transmission during a time unit at least a threshold number of time units after the second physical downlink control channel candidate based on the downlink control information not scheduling a physical downlink shared channel. The feedback component 1335 may be configured as or otherwise support a means for receiving, from the UE, a feedback message in response to the downlink control information at least a threshold number of time units after the second physical downlink control channel candidate.

In some examples, the resource scheduling component 1330 may be configured as or otherwise support a means for determining that the second physical downlink control channel candidate spans a time period ending in a first time unit, where receiving the feedback message includes receiving the feedback message at least the threshold number of time units after the first time unit.

In some examples, the search space component 1350 may be configured as or otherwise support a means for transmitting a configuration of a first search space set and a second search space set. In some examples, the search space component 1350 may be configured as or otherwise support a means for identifying that the first search space set includes the downlink control information and the second search space set includes a repetition of the downlink control information, where transmitting the downlink control information is based on the first search space set including the downlink control information and the second search space set including the repetition of the downlink control information.

In some examples, the monitoring occasion component 1360 may be configured as or otherwise support a means for identifying at least a first monitoring occasion in the first search space set to monitor for the first physical downlink control channel candidate and a second monitoring occasion in the second search space set to monitor for the second physical downlink control channel candidate based on the first search space set including the downlink control information and the second search space set including the repetition of the downlink control information.

In some examples, the control information component 1325 may be configured as or otherwise support a means for determining that the downlink control information is associated with releasing semi-persistent scheduling of a physical downlink shared channel. In some examples, the threshold component 1355 may be configured as or otherwise support a means for calculating the threshold number of time units based on determining that the downlink control information is associated with releasing semi-persistent scheduling of the physical downlink shared channel, where receiving the feedback message includes receiving the feedback message at least the calculated threshold number of time units after the second physical downlink control channel candidate.

In some examples, the control information component 1325 may be configured as or otherwise support a means for determining that the downlink control information is associated with secondary cell dormancy without scheduling the physical downlink shared channel. In some examples, the threshold component 1355 may be configured as or otherwise support a means for calculating the threshold number of time units based on determining that the downlink control information is associated with secondary cell dormancy without scheduling the physical downlink shared channel, where receiving the feedback message includes receiving the feedback message at least the calculated threshold number of time units after the second physical downlink control channel candidate.

In some examples, the control information component 1325 may be configured as or otherwise support a means for determining that the downlink control information is associated with requesting one-shot feedback without scheduling the physical downlink shared channel. In some examples, the threshold component 1355 may be configured as or otherwise support a means for calculating the threshold number of time units based on determining that the downlink control information is associated with requesting one-shot feedback without scheduling the physical downlink shared channel.

In some examples, receiving the feedback message includes receiving the feedback message at least the calculated threshold number of time units after the second physical downlink control channel candidate. In some examples, the threshold number of time units is based on a subcarrier spacing configuration and a processing capability.

Additionally or alternatively, the communications manager 1320 may support wireless communication at a base station in accordance with examples as disclosed herein. The uplink control resource component 1340 may be configured as or otherwise support a means for scheduling a first physical uplink control channel resource for transmitting, by a UE, a first feedback message. In some examples, the control information component 1325 may be configured as or otherwise support a means for transmitting, to the UE, a downlink control information using a first physical downlink control channel candidate and a second physical downlink control channel candidate that are linked for physical downlink control channel repetition, where the second physical downlink control channel candidate ends later in time than the first physical downlink control channel candidate. In some examples, the resource scheduling component 1330 may be configured as or otherwise support a means for determining whether the first physical uplink control channel resource during a time unit at least a threshold number of time units after the second physical downlink control channel candidate. The override determining component 1345 may be configured as or otherwise support a means for determining that the feedback message is to be overridden based on determining that the time unit being at least the threshold number of time units after the second physical downlink control channel candidate.

In some examples, the override determining component 1345 may be configured as or otherwise support a means for determining that the second physical downlink control channel candidate spans a time period ending in a first time unit, where determining that the first physical uplink control channel resource is overridden includes determining that the first physical uplink control channel resource is overridden based on the time unit associated with the first physical uplink control channel resource being scheduled at least the threshold number of time units after the first time unit.

In some examples, the control information component 1325 may be configured as or otherwise support a means for determining that the downlink control information indicates a second physical uplink control channel resource for a physical uplink control channel transmission with a second feedback message. In some examples, the feedback component 1335 may be configured as or otherwise support a means for receiving the feedback message and the second feedback message using the second physical uplink control channel resource based on the time unit associated with the first physical uplink control channel resource being at least the threshold number of time units after the second physical downlink control channel candidate.

In some examples, the search space component 1350 may be configured as or otherwise support a means for transmitting a configuration of a first search space set and a second search space set. In some examples, the search space component 1350 may be configured as or otherwise support a means for identifying that the first search space set includes the downlink control information and the second search space set includes a repetition of the downlink control information, where transmitting the downlink control information is based on the first search space set including the downlink control information and the second search space set including the repetition of the downlink control information.

In some examples, the monitoring occasion component 1360 may be configured as or otherwise support a means for identifying at least a first monitoring occasion in the first search space set to monitor for the first physical downlink control channel candidate and a second monitoring occasion in the second search space set to monitor for the second physical downlink control channel candidate based on the first search space set including the downlink control information and the second search space set including the repetition of the downlink control information.

In some examples, the control information component 1325 may be configured as or otherwise support a means for transmitting, to the UE, a second downlink control information indicating the first physical uplink control channel resource, where the downlink control information is transmitted later than the second downlink control information.

In some examples, the first physical uplink control channel resource is associated with a semi-persistent scheduling physical downlink shared channel release. In some examples, the threshold number of time units is based on a subcarrier spacing configuration and a processing capability.

Figure 14:
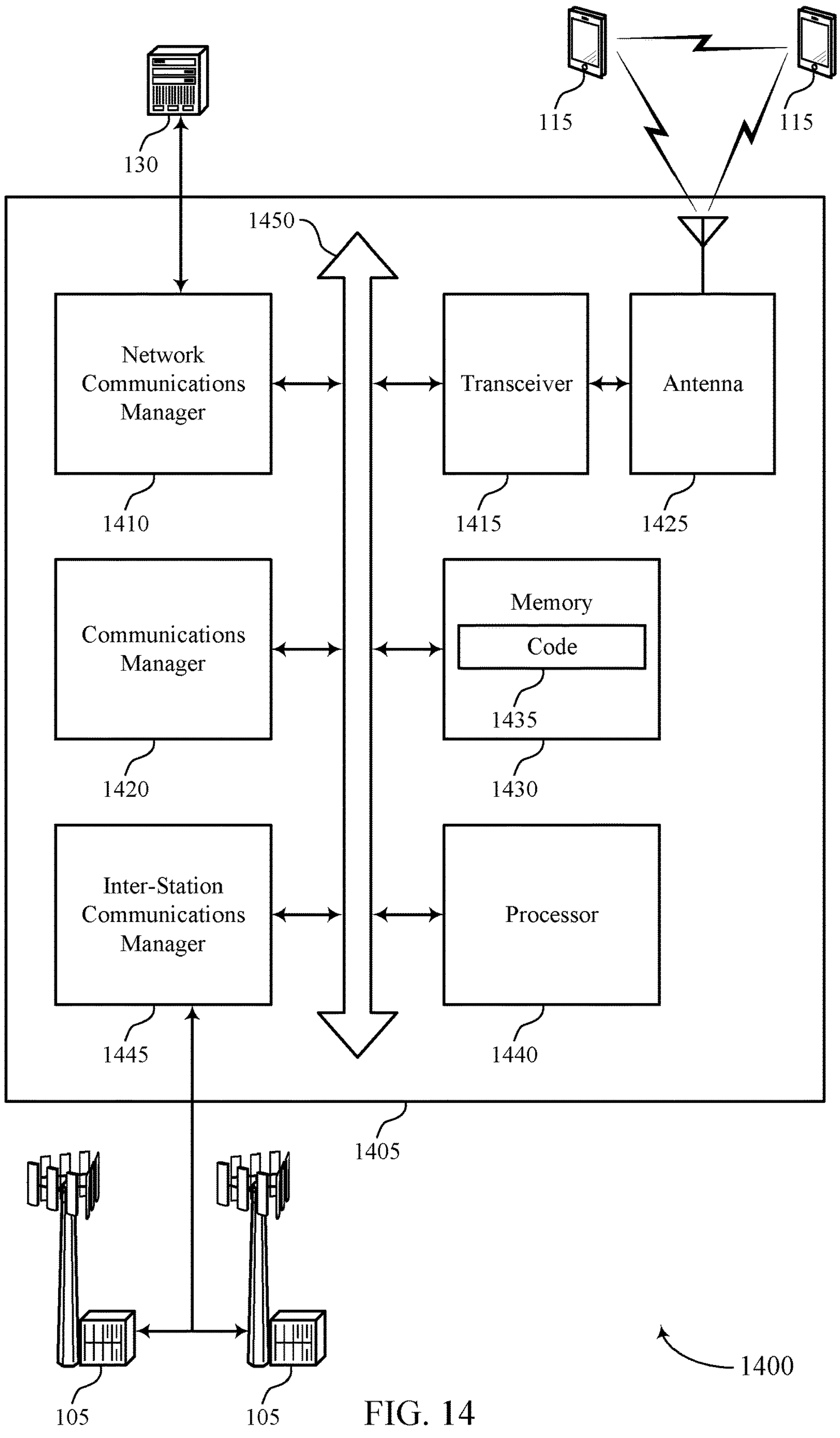
FIG. 14 shows a diagram of a system including a device that supports techniques for downlink control information processing in accordance with aspects of the present disclosure.

FIG. 14 shows a diagram of a system 1400 including a device 1405 that supports techniques for downlink control information processing in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for downlink control information processing). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may be associated with a first network node and may support wireless communication at a base station in accordance with examples as disclosed herein. For example, the communications manager 1420 may be configured as or otherwise support a means for transmitting, to a UE, downlink control information using a first physical downlink control channel candidate and a second physical downlink control channel candidate that are linked for physical downlink control channel repetition, where the second physical downlink control channel candidate ends later in time than the first physical downlink control channel candidate. The communications manager 1420 may be configured as or otherwise support a means for identifying a set of resources for feedback transmission during a time unit at least a threshold number of time units after the second physical downlink control channel candidate based on the downlink control information not scheduling a physical downlink shared channel. The communications manager 1420 may be configured as or otherwise support a means for receiving, from the UE, a feedback message in response to the downlink control information at least a threshold number of time units after the second physical downlink control channel candidate.

Additionally or alternatively, the communications manager 1420 may support wireless communication at a base station in accordance with examples as disclosed herein. For example, the communications manager 1420 may be configured as or otherwise support a means for scheduling a first physical uplink control channel resource for transmitting, by the UE, a first feedback message. The communications manager 1420 may be configured as or otherwise support a means for transmitting, to a UE, a downlink control information using a first physical downlink control channel candidate and a second physical downlink control channel candidate that are linked for physical downlink control channel repetition, where the second physical downlink control channel candidate ends later in time than the first physical downlink control channel candidate. The communications manager 1420 may be configured as or otherwise support a means for determining whether the first physical uplink control channel resource during a time unit at least a threshold number of time units after the second physical downlink control channel candidate. The communications manager 1420 may be configured as or otherwise support a means for that the feedback message is to be overridden based on determining that the time unit being at least the threshold number of time units after the second physical downlink control channel candidate.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for downlink control information processing as described herein, or the processor 1440 and the memory 1430 may be otherwise configured to perform or support such operations.

Figure 15:
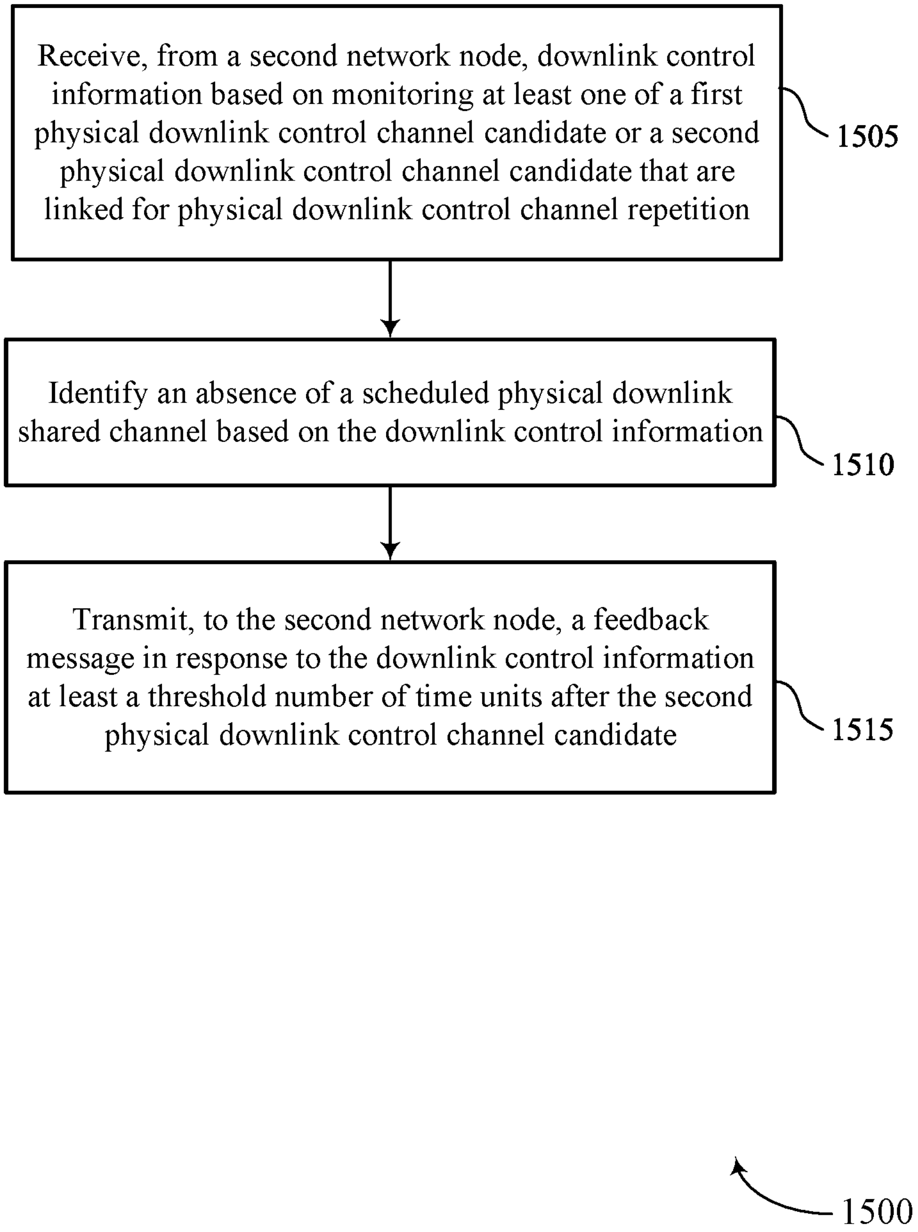
FIGS. 15 through 22 show flowcharts illustrating methods that support techniques for downlink control information processing in accordance with aspects of the present disclosure.

FIG. 15 shows a flowchart illustrating a method 1500 that supports techniques for downlink control information processing in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a second network node, downlink control information based on monitoring at least one of a first physical downlink control channel candidate or a second physical downlink control channel candidate that are linked for physical downlink control channel repetition. In some examples, the second physical downlink control channel candidate ends later in time than the first physical downlink control channel candidate. The operations of 1505 may be performed in accordance with examples as disclosed herein. In some examples, aspects of the operations of 1505 may be performed by a control information component 925 as described with reference to FIG. 9.

At 1510, the method may include identifying an absence of a scheduled physical downlink shared channel based on the downlink control information. The operations of 1510 may be performed in accordance with examples as disclosed herein. In some examples, aspects of the operations of 1510 may be performed by a physical downlink shared channel identification component 930 as described with reference to FIG. 9.

At 1515, the method may include transmitting, to the base station, a feedback message in response to the downlink control information at least a threshold number of time units after the second physical downlink control channel candidate. The operations of 1515 may be performed in accordance with examples as disclosed herein. In some examples, aspects of the operations of 1515 may be performed by a feedback component 935 as described with reference to FIG. 9.

Figure 16:
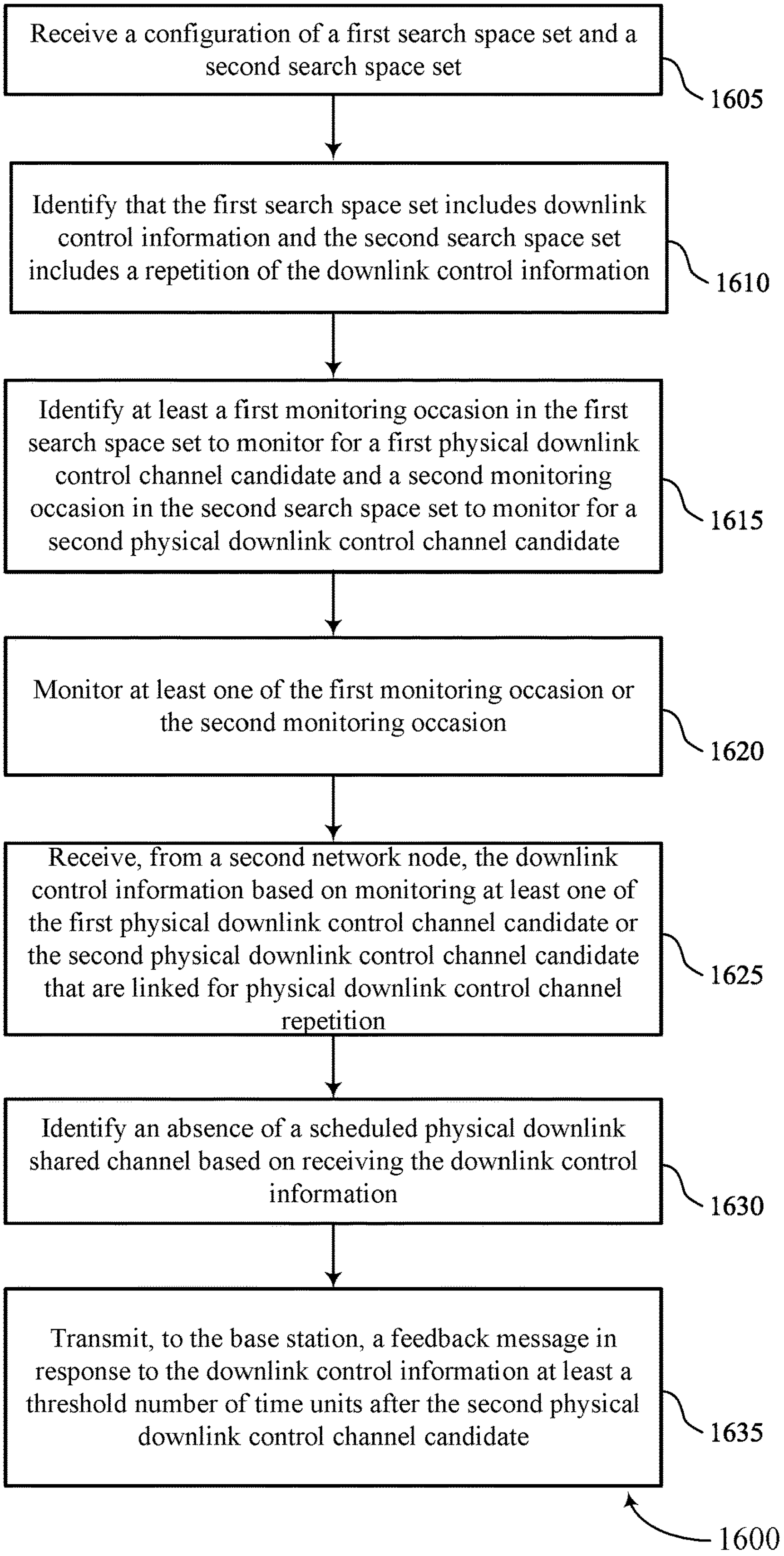

FIG. 16 shows a flowchart illustrating a method 1600 that supports techniques for downlink control information processing in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving a configuration of a first search space set and a second search space set. The operations of 1605 may be performed in accordance with examples as disclosed herein. In some examples, aspects of the operations of 1605 may be performed by a search space component 950 as described with reference to FIG. 9.

At 1610, the method may include identifying that the first search space set includes downlink control information and the second search space set includes a repetition of the downlink control information. The operations of 1610 may be performed in accordance with examples as disclosed herein. In some examples, aspects of the operations of 1610 may be performed by a search space component 950 as described with reference to FIG. 9.

At 1615, the method may include identifying at least a first monitoring occasion in the first search space set to monitor for a first physical downlink control channel candidate and a second monitoring occasion in the second search space set to monitor for a second physical downlink control channel candidate. In some examples, the first monitoring occasion and the second monitoring occasion may be identified based on the first search space set including the downlink control information and the second search space set including the repetition of the downlink control information. The operations of 1615 may be performed in accordance with examples as disclosed herein. In some examples, aspects of the operations of 1615 may be performed by a monitoring occasion component 965 as described with reference to FIG. 9.

At 1620, the method may include monitoring at least one of the first monitoring occasion or the second monitoring occasion. The operations of 1620 may be performed in accordance with examples as disclosed herein. In some examples, aspects of the operations of 1620 may be performed by a monitoring occasion component 965 as described with reference to FIG. 9.

At 1625, the method may include receiving, from a second network node, downlink control information based on monitoring at least one of the first physical downlink control channel candidate or a second physical downlink control channel candidate that are linked for physical downlink control channel repetition. In some examples, the second physical downlink control channel candidate ends later in time than the first physical downlink control channel candidate.

In some examples, receiving the downlink control information is based on the first search space set including the downlink control information and the second search space set including the repetition of the downlink control information. In some examples, receiving the downlink control information is based on monitoring at least one of the first monitoring occasion or the second monitoring occasion. The operations of 1625 may be performed in accordance with examples as disclosed herein. In some examples, aspects of the operations of 1625 may be performed by a control information component 925 as described with reference to FIG. 9.

At 1630, the method may include identifying an absence of a scheduled physical downlink shared channel based on the downlink control information. The operations of 1630 may be performed in accordance with examples as disclosed herein. In some examples, aspects of the operations of 1630 may be performed by a physical downlink shared channel identification component 930 as described with reference to FIG. 9.

At 1635, the method may include transmitting, to the base station, a feedback message in response to the downlink control information at least a threshold number of time units after the second physical downlink control channel candidate. The operations of 1635 may be performed in accordance with examples as disclosed herein. In some examples, aspects of the operations of 1635 may be performed by a feedback component 935 as described with reference to FIG. 9.

Figure 17:
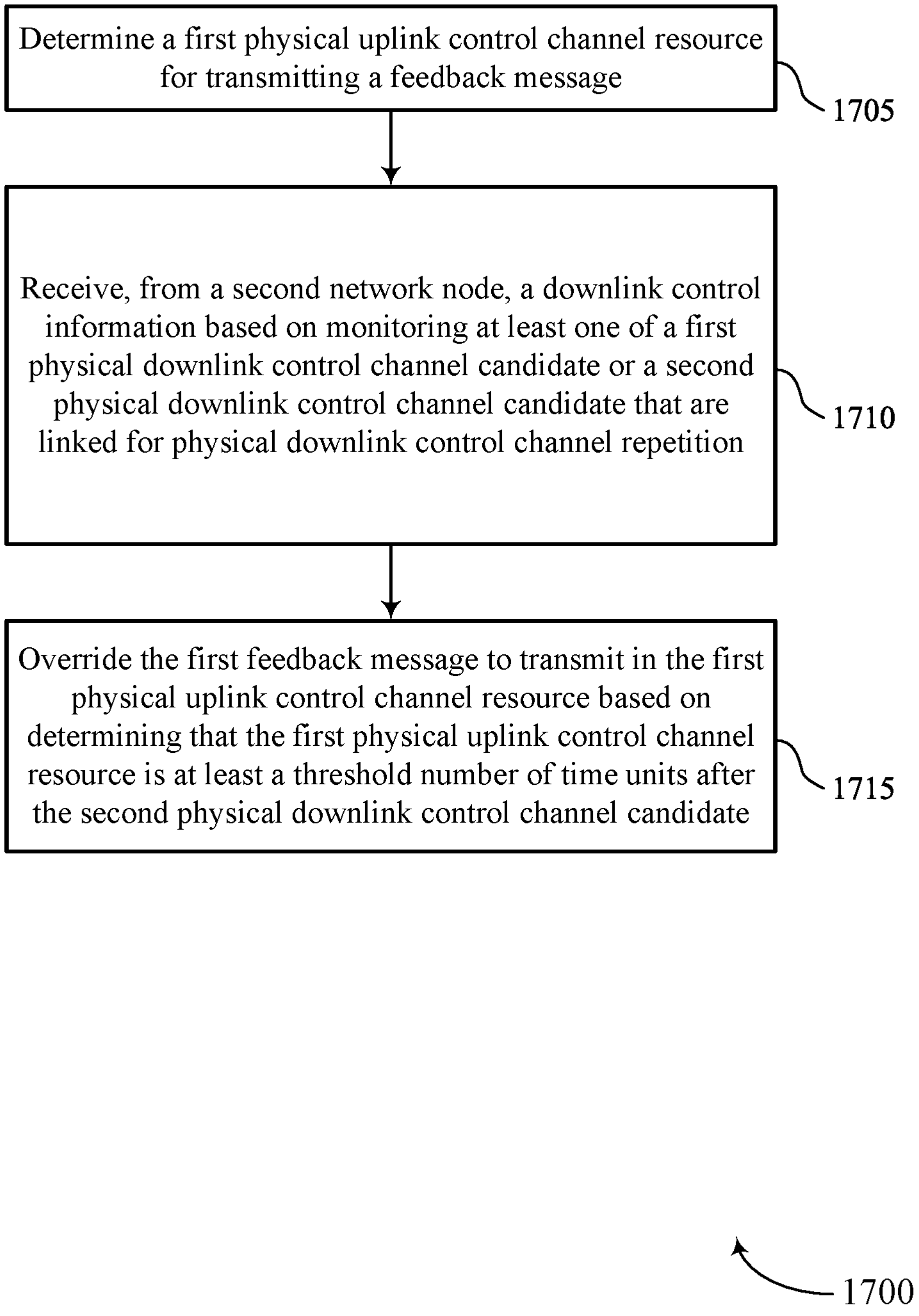

FIG. 17 shows a flowchart illustrating a method 1700 that supports techniques for downlink control information processing in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include determining a first physical uplink control channel resource for transmitting a feedback message. The operations of 1705 may be performed in accordance with examples as disclosed herein. In some examples, aspects of the operations of 1705 may be performed by an uplink control resource component 940 as described with reference to FIG. 9.

At 1710, the method may include receiving, from a second network node, a downlink control information based on monitoring at least one of a first physical downlink control channel candidate or a second physical downlink control channel candidate that are linked for physical downlink control channel repetition. In some examples, the second physical downlink control channel candidate ends later in time than the first physical downlink control channel candidate. The operations of 1710 may be performed in accordance with examples as disclosed herein. In some examples, aspects of the operations of 1710 may be performed by a control information component 925 as described with reference to FIG. 9.

At 1715, the method may include overriding the first feedback message to transmit in the first physical uplink control channel resource based on determining that the first physical uplink control channel resource is at least a threshold number of time units after the second physical downlink control channel candidate. The operations of 1715 may be performed in accordance with examples as disclosed herein. In some examples, aspects of the operations of 1715 may be performed by an override component 945 as described with reference to FIG. 9.

Figure 18:
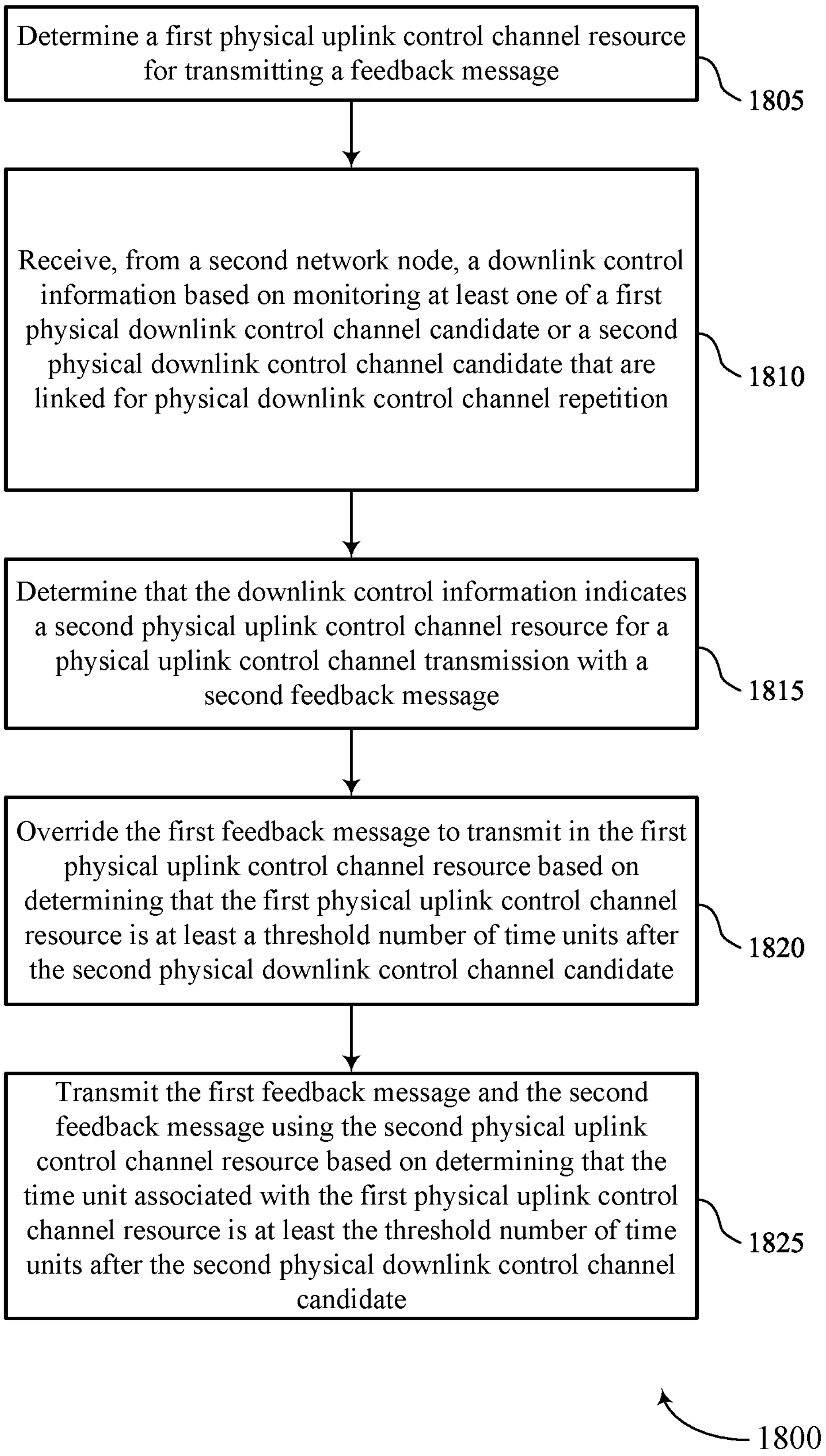

FIG. 18 shows a flowchart illustrating a method 1800 that supports techniques for downlink control information processing in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include determining a first physical uplink control channel resource for transmitting a feedback message. The operations of 1805 may be performed in accordance with examples as disclosed herein. In some examples, aspects of the operations of 1805 may be performed by an uplink control resource component 940 as described with reference to FIG. 9.

At 1810, the method may include receiving, from a second network node, a downlink control information based on monitoring at least one of a first physical downlink control channel candidate or a second physical downlink control channel candidate that are linked for physical downlink control channel repetition. In some examples, the second physical downlink control channel candidate ends later in time than the first physical downlink control channel candidate. The operations of 1810 may be performed in accordance with examples as disclosed herein. In some examples, aspects of the operations of 1810 may be performed by a control information component 925 as described with reference to FIG. 9.

At 1815, the method may include determining that the downlink control information indicates a second physical uplink control channel resource for a physical uplink control channel transmission with a second feedback message. The operations of 1815 may be performed in accordance with examples as disclosed herein. In some examples, aspects of the operations of 1815 may be performed by a control information component 925 as described with reference to FIG. 9.

At 1820, the method may include overriding the first feedback message to transmit in the first physical uplink control channel resource based on determining that the first physical uplink control channel resource is at least a threshold number of time units after the second physical downlink control channel candidate. The operations of 1820 may be performed in accordance with examples as disclosed herein. In some examples, aspects of the operations of 1820 may be performed by an override component 945 as described with reference to FIG. 9.

At 1825, the method may include transmitting the first feedback message and the second feedback message using the second physical uplink control channel resource based on determining that the time unit associated with the first physical uplink control channel resource is at least the threshold number of time units after the second physical downlink control channel candidate. The operations of 1825 may be performed in accordance with examples as disclosed herein. In some examples, aspects of the operations of 1825 may be performed by a feedback component 935 as described with reference to FIG. 9.

Figure 19:
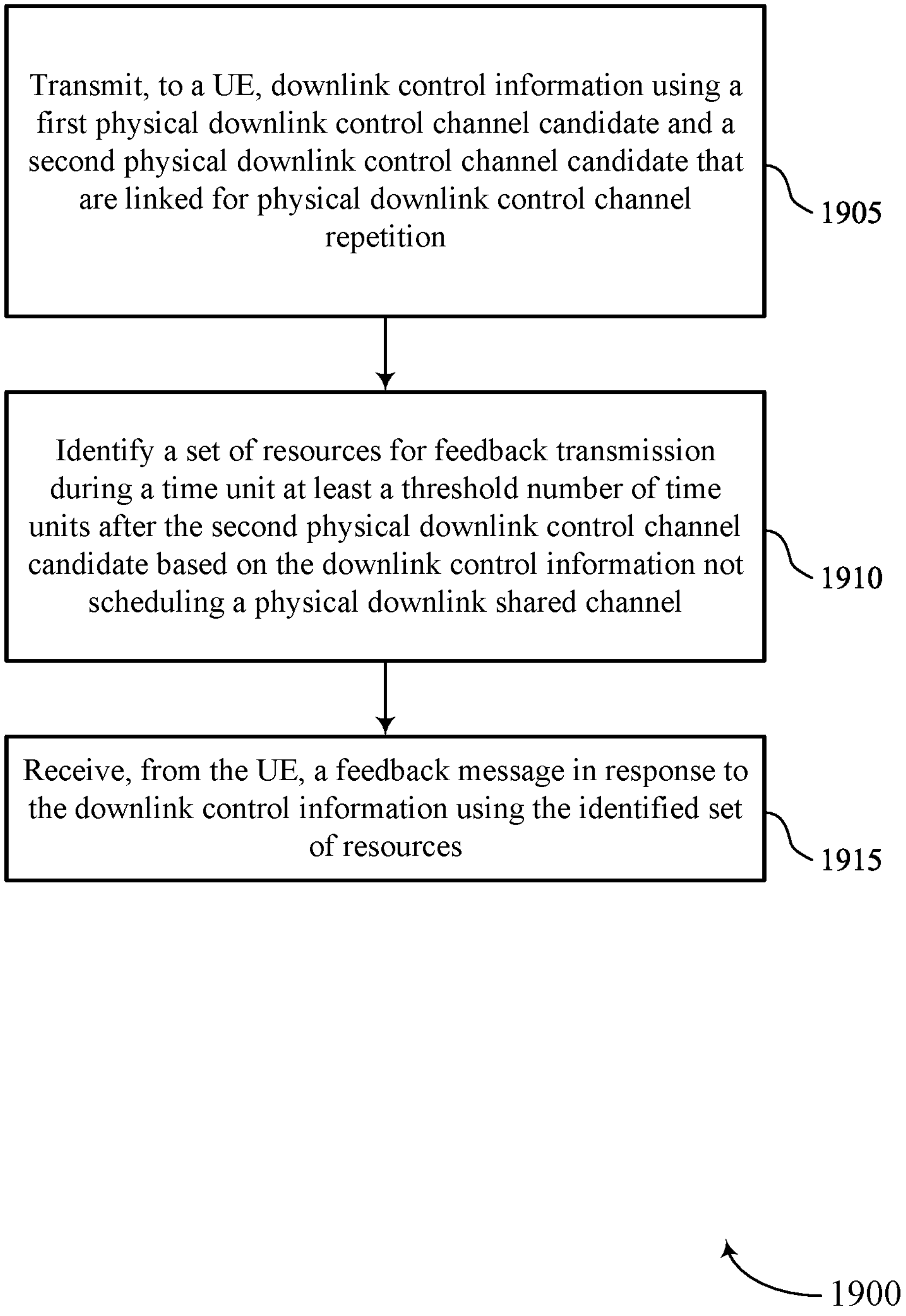

FIG. 19 shows a flowchart illustrating a method 1900 that supports techniques for downlink control information processing in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, downlink control information using a first physical downlink control channel candidate and a second physical downlink control channel candidate that are linked for physical downlink control channel repetition. In some examples, the second physical downlink control channel candidate ends later in time than the first physical downlink control channel candidate. The operations of 1905 may be performed in accordance with examples as disclosed herein. In some examples, aspects of the operations of 1905 may be performed by a control information component 1325 as described with reference to FIG. 13.

At 1910, the method may include identifying a set of resources for feedback transmission during a time unit at least a threshold number of time units after the second physical downlink control channel candidate based on the downlink control information not scheduling a physical downlink shared channel. The operations of 1910 may be performed in accordance with examples as disclosed herein. In some examples, aspects of the operations of 1910 may be performed by a resource scheduling component 1330 as described with reference to FIG. 13.

At 1915, the method may include receiving, from the UE, a feedback message in response to the downlink control information using the identified set of resources. The operations of 1915 may be performed in accordance with examples as disclosed herein. In some examples, aspects of the operations of 1915 may be performed by a feedback component 1335 as described with reference to FIG. 13.

Figure 20:
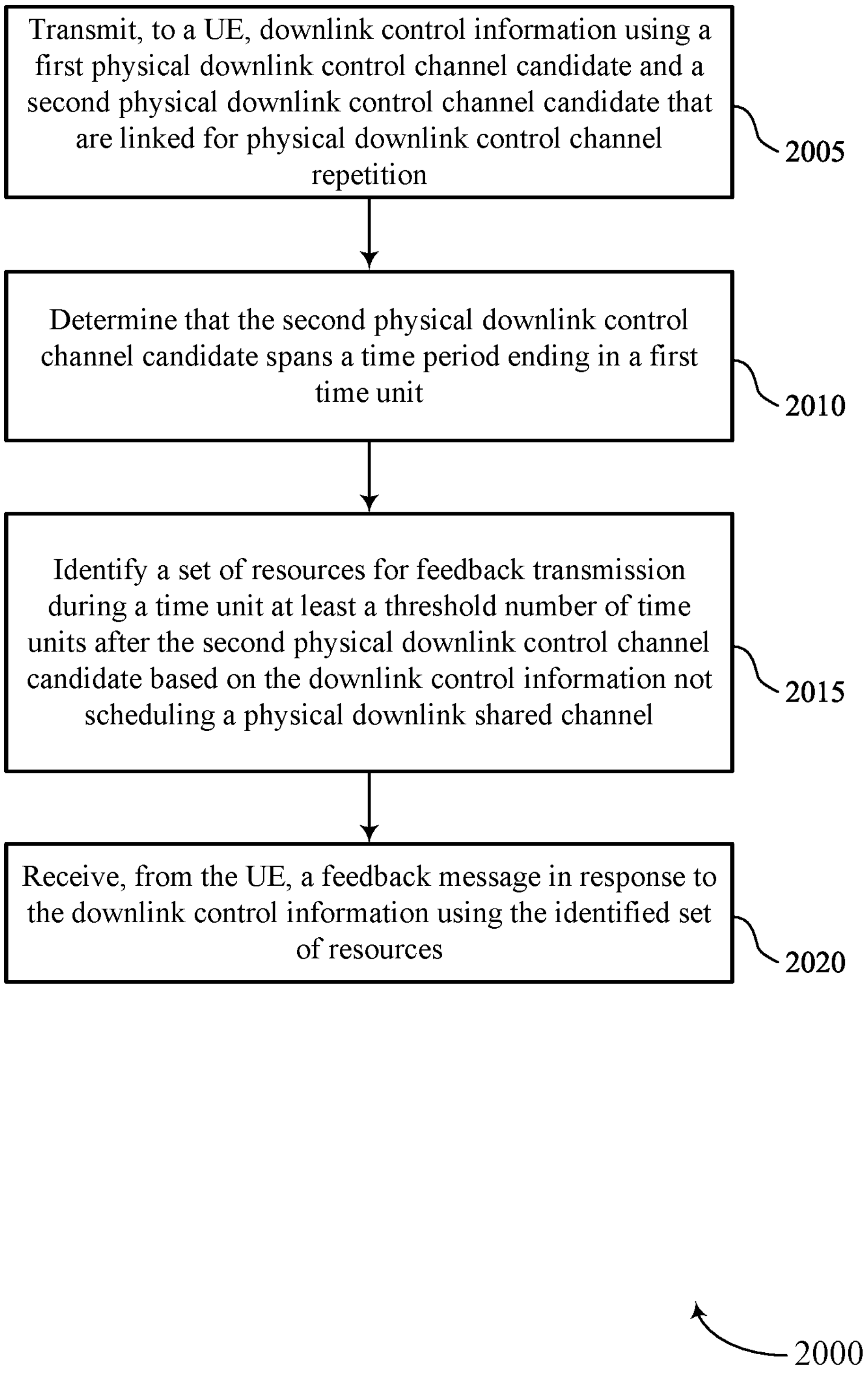

FIG. 20 shows a flowchart illustrating a method 2000 that supports techniques for downlink control information processing in accordance with aspects of the present disclosure. The operations of the method 2000 may be implemented by a base station or its components as described herein. For example, the operations of the method 2000 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, downlink control information using a first physical downlink control channel candidate and a second physical downlink control channel candidate that are linked for physical downlink control channel repetition. In some examples, the second physical downlink control channel candidate ends later in time than the first physical downlink control channel candidate. The operations of 2005 may be performed in accordance with examples as disclosed herein. In some examples, aspects of the operations of 2005 may be performed by a control information component 1325 as described with reference to FIG. 13.

At 2010, the method may include determining that the second physical downlink control channel candidate spans a time period ending in a first time unit. The operations of 2010 may be performed in accordance with examples as disclosed herein. In some examples, aspects of the operations of 2010 may be performed by a resource scheduling component 1330 as described with reference to FIG. 13.

At 2015, the method may include identifying a set of resources for feedback transmission during a time unit at least a threshold number of time units after the second physical downlink control channel candidate based on the downlink control information not scheduling a physical downlink shared channel. The operations of 2015 may be performed in accordance with examples as disclosed herein. In some examples, aspects of the operations of 2015 may be performed by a resource scheduling component 1330 as described with reference to FIG. 13.

At 2020, the method may include receiving, from the UE, a feedback message in response to the downlink control information using the identified set of resources. In some examples, receiving the feedback message includes receiving the feedback message at least the threshold number of time units after the first time unit. The operations of 2020 may be performed in accordance with examples as disclosed herein. In some examples, aspects of the operations of 2020 may be performed by a feedback component 1335 as described with reference to FIG. 13.

Figure 21:
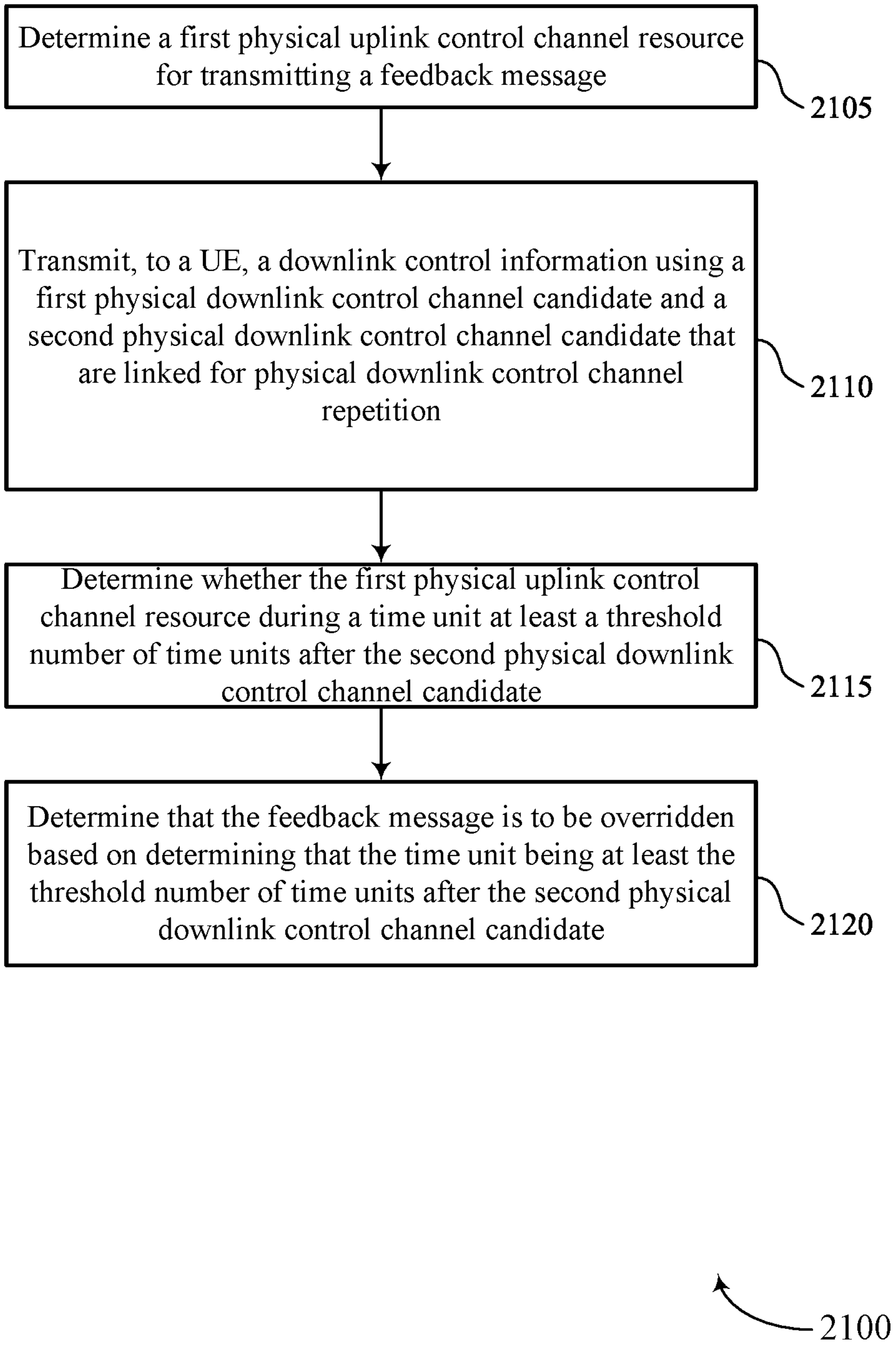

FIG. 21 shows a flowchart illustrating a method 2100 that supports techniques for downlink control information processing in accordance with aspects of the present disclosure. The operations of the method 2100 may be implemented by a base station or its components as described herein. For example, the operations of the method 2100 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2105, the method may include determining a first physical uplink control channel resource for transmitting a feedback message. The operations of 2105 may be performed in accordance with examples as disclosed herein. In some examples, aspects of the operations of 2105 may be performed by an uplink control resource component 1340 as described with reference to FIG. 13.

At 2110, the method may include transmitting, to a UE, a downlink control information using a first physical downlink control channel candidate and a second physical downlink control channel candidate that are linked for physical downlink control channel repetition. In some examples, the second physical downlink control channel candidate ends later in time than the first physical downlink control channel candidate. The operations of 2110 may be performed in accordance with examples as disclosed herein. In some examples, aspects of the operations of 2110 may be performed by a control information component 1325 as described with reference to FIG. 13.

At 2115, the method may include determining whether the first physical uplink control channel resource during a time unit at least a threshold number of time units after the second physical downlink control channel candidate. The operations of 2115 may be performed in accordance with examples as disclosed herein. In some examples, aspects of the operations of 2115 may be performed by a resource scheduling component 1330 as described with reference to FIG. 13.

At 2120, the method may include determining that the feedback message is to be overridden based on determining that the time unit being at least the threshold number of time units after the second physical downlink control channel candidate. The operations of 2120 may be performed in accordance with examples as disclosed herein. In some examples, aspects of the operations of 2120 may be performed by an override determining component 1345 as described with reference to FIG. 13.

Figure 22:
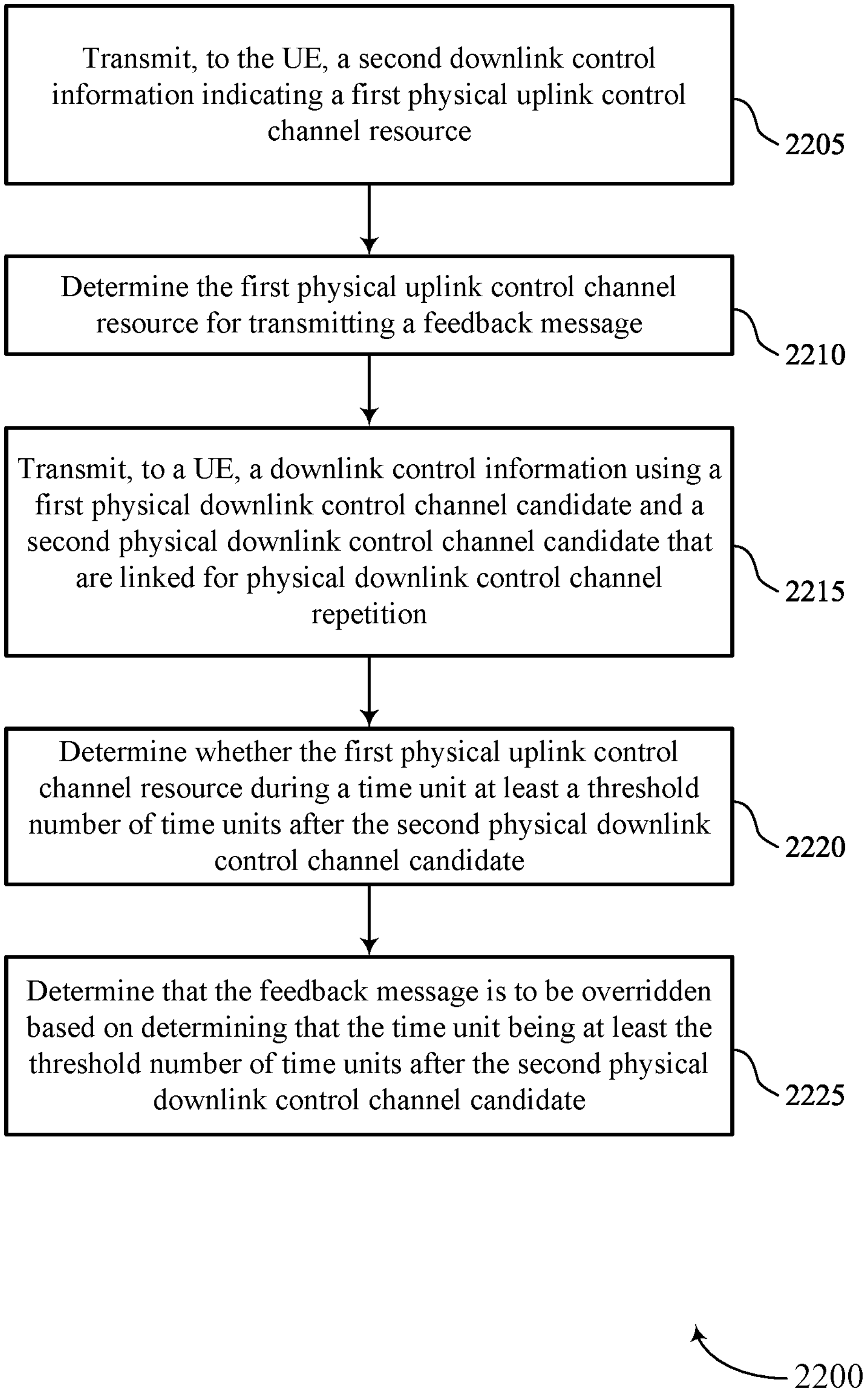

FIG. 22 shows a flowchart illustrating a method 2200 that supports techniques for downlink control information processing in accordance with aspects of the present disclosure. The operations of the method 2200 may be implemented by a base station or its components as described herein. For example, the operations of the method 2200 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2205, the method may include transmitting, to the UE, a second downlink control information indicating a first physical uplink control channel resource. The operations of 2205 may be performed in accordance with examples as disclosed herein. In some examples, aspects of the operations of 2205 may be performed by a control information component 1325 as described with reference to FIG. 13.

At 2210, the method may include determining the first physical uplink control channel resource for transmitting a feedback message. The operations of 2210 may be performed in accordance with examples as disclosed herein. In some examples, aspects of the operations of 2210 may be performed by an uplink control resource component 1340 as described with reference to FIG. 13.

At 2215, the method may include transmitting, to a UE, a downlink control information using a first physical downlink control channel candidate and a second physical downlink control channel candidate that are linked for physical downlink control channel repetition. In some examples, the second physical downlink control channel candidate ends later in time than the first physical downlink control channel candidate. In some examples, the downlink control information is transmitted later than the second downlink control information. The operations of 2215 may be performed in accordance with examples as disclosed herein. In some examples, aspects of the operations of 2215 may be performed by a control information component 1325 as described with reference to FIG. 13.

At 2220, the method may include determining whether the first physical uplink control channel resource during a time unit at least a threshold number of time units after the second physical downlink control channel candidate. The operations of 2220 may be performed in accordance with examples as disclosed herein. In some examples, aspects of the operations of 2220 may be performed by a resource scheduling component 1330 as described with reference to FIG. 13.

At 2225, the method may include determining that the feedback message is to be overridden based on determining that the time unit being at least the threshold number of time units after the second physical downlink control channel candidate. The operations of 2225 may be performed in accordance with examples as disclosed herein. In some examples, aspects of the operations of 2225 may be performed by an override determining component 1345 as described with reference to FIG. 13.

The following provides an overview of aspects of the present disclosure:

Aspect 1: A method for wireless communication at a first network node, comprising: receiving, from a second network node, downlink control information based on monitoring at least one of a first physical downlink control channel candidate or a second physical downlink control channel candidate that are linked for physical downlink control channel repetition, wherein the second physical downlink control channel candidate ends later in time than the first physical downlink control channel candidate; and transmitting, to the second network node, a feedback message in response to the downlink control information at least a threshold number of time units after the second physical downlink control channel candidate.

Aspect 2: The method of aspect 1, further comprising: identifying that the downlink control information is not scheduling a physical downlink shared channel transmission.

Aspect 3: The method of aspects 1 through 2, further comprising: determining that the second physical downlink control channel candidate spans a time period ending in a first time unit, wherein transmitting the feedback message comprises transmitting the feedback message at least the threshold number of time units after the first time unit.

Aspect 4: The method of any of aspects 1 through 3, further comprising: receiving a configuration of a first search space set and a second search space set; and identifying that the first search space set includes the downlink control information and the second search space set includes a repetition of the downlink control information, wherein receiving the downlink control information is based on the first search space set including the downlink control information and the second search space set including the repetition of the downlink control information.

Aspect 5: The method of aspect 4, further comprising: identifying at least a first monitoring occasion in the first search space set to monitor for the first physical downlink control channel candidate and a second monitoring occasion in the second search space set to monitor for the second physical downlink control channel candidate based on the first search space set including the downlink control information and the second search space set including the repetition of the downlink control information; and monitoring at least one of the first monitoring occasion or the second monitoring occasion, wherein receiving the downlink control information is based on the monitoring.

Aspect 6: The method of any of aspects 1 through 5, further comprising: determining that the downlink control information is associated with releasing semi-persistent scheduling of a physical downlink shared channel; and calculating the threshold number of time units based on determining that the downlink control information is associated with releasing semi-persistent scheduling of the physical downlink shared channel, wherein transmitting the feedback message comprises transmitting the feedback message at least the calculated threshold number of time units after the second physical downlink control channel candidate.

Aspect 7: The method of any of aspects 1 through 6, further comprising: determining that the downlink control information is associated with secondary cell dormancy without scheduling a physical downlink shared channel; and calculating the threshold number of time units based on determining that the downlink control information is associated with secondary cell dormancy without scheduling the physical downlink shared channel, wherein transmitting the feedback message comprises transmitting the feedback message at least the calculated threshold number of time units after the second physical downlink control channel candidate.

Aspect 8: The method of any of aspects 1 through 7, further comprising: determining that the downlink control information is associated with requesting one-shot feedback without scheduling a physical downlink shared channel; and calculating the threshold number of time units based on determining that the downlink control information is associated with requesting one-shot feedback without scheduling the physical downlink shared channel, wherein transmitting the feedback message comprises transmitting the feedback message at least the calculated threshold number of time units after the second physical downlink control channel candidate.

Aspect 9: The method of any of aspects 1 through 8, further comprising: decoding at least one of the first physical downlink control channel candidate or the second physical downlink control channel candidate, wherein receiving the downlink control information is based on the decoding, wherein the set of time and frequency resources is at least the threshold number of time units after the second physical downlink control channel candidate.

Aspect 10: The method of any of aspects 1 through 9, further comprising: soft combining a signal associated with the first physical downlink control channel candidate with a signal associated with the second physical downlink control channel candidate; and decoding the soft-combined signal, wherein receiving the downlink control information is based on the decoding.

Aspect 11: The method of any of aspects 1 through 10, further comprising: decoding at least one of the first physical downlink control channel candidate or the second physical downlink control channel candidate; and identifying a set of time and frequency resources that is for transmitting the feedback message based on the decoding, wherein the set of time and frequency resources is scheduled at least the threshold number of time units after the second physical downlink control channel candidate, wherein transmitting the feedback message comprises transmitting the feedback message during the identified set of time and frequency resources.

Aspect 12: The method of any of aspects 1 through 11, wherein the threshold number of time units is based on a subcarrier spacing configuration and a processing capability.

Aspect 13: A method for wireless communication at a first network node, comprising: determining a first physical uplink control channel resource for transmitting a feedback message; receiving, from a second network node, a downlink control information based on monitoring at least one of a first physical downlink control channel candidate or a second physical downlink control channel candidate that are linked for physical downlink control channel repetition, wherein the second physical downlink control channel candidate ends later in time than the first physical downlink control channel candidate; and overriding the first feedback message to transmit in the first physical uplink control channel resource based on determining the first physical uplink control channel resource is at least a threshold number of time units after the second physical downlink control channel candidate.

Aspect 14: The method of aspect 13, further comprising: determining that the second physical downlink control channel candidate spans a time period ending in a first time unit, wherein overriding the feedback message to transmit in the first physical uplink control channel resource comprises overriding the first feedback message to transmit in the first physical uplink control channel resource based on the first physical uplink control channel resource being at least the threshold number of time units after the first time unit.

Aspect 15: The method of any of aspects 13 through 14, further comprising: determining that the downlink control information indicates a second physical uplink control channel resource for a physical uplink control channel transmission with a second feedback message; and transmitting the first feedback message and the second feedback message using the second physical uplink control channel resource based on the first physical uplink control channel resource being at least the threshold number of time units after the second physical downlink control channel candidate.

Aspect 16: The method of any of aspects 13 through 15, further comprising: receiving a configuration of a first search space set and a second search space set; and identifying that the first search space set includes the downlink control information and the second search space set includes a repetition of the downlink control information, wherein receiving the downlink control information is based on the first search space set including the downlink control information and the second search space set including the repetition of the downlink control information.

Aspect 17: The method of aspect 16, further comprising: identifying at least a first monitoring occasion in the first search space set to monitor for the first physical downlink control channel candidate and a second monitoring occasion in the second search space set to monitor for the second physical downlink control channel candidate based on the first search space set including the downlink control information and the second search space set including the repetition of the downlink control information; and monitoring at least one of the first monitoring occasion or the second monitoring occasion, wherein receiving the downlink control information is based on the monitoring.

Aspect 18: The method of any of aspects 13 through 17, further comprising: decoding at least one of the first physical downlink control channel candidate or the second physical downlink control channel candidate, wherein receiving the downlink control information is based on the decoding.

Aspect 19: The method of any of aspects 13 through 18, further comprising: soft combining a signal associated with the first physical downlink control channel candidate with a signal associated with the second physical downlink control channel candidate; and decoding the soft-combined signal, wherein receiving the downlink control information is based on the decoding.

Aspect 20: The method of any of aspects 13 through 19, further comprising: receiving, from the second network node, a second downlink control information indicating the first physical uplink control channel resource, wherein the downlink control information is received later than the second downlink control information.

Aspect 21: The method of any of aspects 13 through 20, wherein the first physical uplink control channel resource is associated with a semi-persistent scheduling physical downlink shared channel release.

Aspect 22: The method of any of aspects 13 through 21, wherein the threshold number of time units is based on a subcarrier spacing configuration and a processing capability.

Aspect 23: A method for wireless communication at a first network node, comprising: transmitting, to a second network node, downlink control information using a first physical downlink control channel candidate and a second physical downlink control channel candidate that are linked for physical downlink control channel repetition, wherein the second physical downlink control channel candidate ends later in time than the first physical downlink control channel candidate; and receiving, from the second network node, a feedback message in response to the downlink control information at least a threshold number of time units after the second physical downlink control channel candidate.

Aspect 24: The method of aspect 23, further comprising: identify a set of resources for feedback transmission during a time unit at least the threshold number of time units after the second physical downlink control channel candidate based on the downlink control information not scheduling a physical downlink shared channel.

Aspect 25: The method of aspects 23 through 24, further comprising: determining that the second physical downlink control channel candidate spans a time period ending in a first time unit, wherein receiving the feedback message comprises receiving the feedback message at least the threshold number of time units after the first time unit.

Aspect 26: The method of any of aspects 23 through 25, further comprising: transmitting a configuration of a first search space set and a second search space set; and identifying that the first search space set includes the downlink control information and the second search space set includes a repetition of the downlink control information, wherein transmitting the downlink control information is based on the first search space set including the downlink control information and the second search space set including the repetition of the downlink control information.

Aspect 27: The method of aspect 26, further comprising: identifying at least a first monitoring occasion in the first search space set to monitor for the first physical downlink control channel candidate and a second monitoring occasion in the second search space set to monitor for the second physical downlink control channel candidate based on the first search space set including the downlink control information and the second search space set including the repetition of the downlink control information.

Aspect 28: The method of any of aspects 23 through 27, further comprising: determining that the downlink control information is associated with releasing semi-persistent scheduling of a physical downlink shared channel; and calculating the threshold number of time units based on determining that the downlink control information is associated with releasing semi-persistent scheduling of the physical downlink shared channel, wherein receiving the feedback message comprises receiving the feedback message at least the calculated threshold number of time units after the second physical downlink control channel candidate.

Aspect 29: The method of any of aspects 23 through 28, further comprising: determining that the downlink control information is associated with secondary cell dormancy without scheduling the physical downlink shared channel; and calculating the threshold number of time units based on determining that the downlink control information is associated with secondary cell dormancy without scheduling the physical downlink shared channel, wherein receiving the feedback message comprises receiving the feedback message at least the calculated threshold number of time units after the second physical downlink control channel candidate.

Aspect 30: The method of any of aspects 23 through 29, further comprising: determining that the downlink control information is associated with requesting one-shot feedback without scheduling the physical downlink shared channel; and calculating the threshold number of time units based on determining that the downlink control information is associated with requesting one-shot feedback without scheduling the physical downlink shared channel, wherein receiving the feedback message comprises receiving the feedback message at least the calculated threshold number of time units after the second physical downlink control channel candidate.

Aspect 31: The method of any of aspects 23 through 30, wherein the threshold number of time units is based on a subcarrier spacing configuration and a processing capability.

Aspect 32: A method for wireless communication at a first network node, comprising: scheduling a first physical uplink control channel resource for transmitting, by a second network node, a first feedback message; transmitting, to the second network node, a downlink control information using a first physical downlink control channel candidate and a second physical downlink control channel candidate that are linked for physical downlink control channel repetition, wherein the second physical downlink control channel candidate ends later in time than the first physical downlink control channel candidate; determining whether the first physical uplink control channel resource during a time unit at least a threshold number of time units after the second physical downlink control channel candidate; and determining that the feedback message is to be overridden based on determining that the time unit being at least the threshold number of time units after the second physical downlink control channel candidate.

Aspect 33: The method of aspect 32, further comprising: determining that the second physical downlink control channel candidate spans a time period ending in a first time unit, wherein determining that the first physical uplink control channel resource is overridden comprises determining that the first physical uplink control channel resource is overridden based on the time unit associated with the first physical uplink control channel resource being scheduled at least the threshold number of time units after the first time unit.

Aspect 34: The method of any of aspects 32 through 33, further comprising: determining that the downlink control information indicates a second physical uplink control channel resource for a physical uplink control channel transmission with a second feedback message; and receiving the feedback message and the second feedback message using the second physical uplink control channel resource based on the time unit associated with the first physical uplink control channel resource being at least the threshold number of time units after the second physical downlink control channel candidate.

Aspect 35: The method of any of aspects 32 through 34, further comprising: transmitting a configuration of a first search space set and a second search space set; and identifying that the first search space set includes the downlink control information and the second search space set includes a repetition of the downlink control information, wherein transmitting the downlink control information is based on the first search space set including the downlink control information and the second search space set including the repetition of the downlink control information.

Aspect 36: The method of aspect 35, further comprising: identifying at least a first monitoring occasion in the first search space set to monitor for the first physical downlink control channel candidate and a second monitoring occasion in the second search space set to monitor for the second physical downlink control channel candidate based on the first search space set including the downlink control information and the second search space set including the repetition of the downlink control information.

Aspect 37: The method of any of aspects 32 through 36, further comprising: transmitting, to the second network node, a second downlink control information indicating the first physical uplink control channel resource, wherein the downlink control information is transmitted later than the second downlink control information.

Aspect 38: The method of any of aspects 32 through 37, wherein the first physical uplink control channel resource is associated with a semi-persistent scheduling physical downlink shared channel release.

Aspect 39: The method of any of aspects 32 through 38, wherein the threshold number of time units is based on a subcarrier spacing configuration and a processing capability.

Aspect 40: An apparatus for wireless communication at a first network node, comprising at least one processor; and memory coupled with the at least one processor, wherein the at least one processor is configured to perform a method of any of aspects 1 through 12.

Aspect 41: An apparatus for wireless communication at a first network node, comprising at least one means for performing a method of any of aspects 1 through 12.

Aspect 42: A non-transitory computer-readable medium storing code for wireless communication at a first network node, the code comprising instructions executable by a processor to perform a method of any of aspects 1 through 12.

Aspect 43: An apparatus for wireless communication at a first network node, comprising at least one processor; and memory coupled with the at least one processor, wherein the at least one processor is configured to perform a method of any of aspects 13 through 22.

Aspect 44: An apparatus for wireless communication at a first network node, comprising at least one means for performing a method of any of aspects 13 through 22.

Aspect 45: A non-transitory computer-readable medium storing code for wireless communication at a first network node, the code comprising instructions executable by a processor to perform a method of any of aspects 13 through 22.

Aspect 46: An apparatus for wireless communication at a first network node, comprising at least one processor; and memory coupled with the at least one processor, wherein the at least one processor is configured to perform a method of any of aspects 23 through 31.

Aspect 47: An apparatus for wireless communication at a first network node, comprising at least one means for performing a method of any of aspects 23 through 31.

Aspect 48: A non-transitory computer-readable medium storing code for wireless communication at a first network node, the code comprising instructions executable by a processor to perform a method of any of aspects 23 through 31.

Aspect 49: An apparatus for wireless communication at a first network node, comprising at least one processor; and memory coupled with the at least one processor, wherein the at least one processor is configured to perform a method of any of aspects 32 through 39.

Aspect 50: An apparatus for wireless communication at a first network node, comprising at least one means for performing a method of any of aspects 32 through 39.

Aspect 51: A non-transitory computer-readable medium storing code for wireless communication at a first network node, the code comprising instructions executable by a processor to perform a method of any of aspects 32 through 39.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

As described herein, a node, which may be referred to as a node, a network node, a network entity, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a first one or more components, a first processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A."

The term "determine" or "determining" encompasses a wide variety of actions and, therefore, "determining" can include calculating, computing, processing, deriving, investigating, looking up (such as via looking up in a table, a database or another data structure), ascertaining, and the like. Also, "determining" can include receiving (such as receiving information), accessing (such as accessing data in a memory) and the like. Also, "determining" can include resolving, selecting, choosing, establishing and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "example" used herein means "serving as an example, instance, or illustration," and not "preferred" or "advantageous over other examples." The term "aspect" used herein means "serving as an example, instance, or illustration," and not "preferred" or "advantageous over other aspects." The detailed description includes specific details for the purpose of providing an understanding of the described techniques. These techniques, however, may be practiced without these specific details.

The description herein enables a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs of the various aspects described herein but is to be accorded the broadest scope consistent with the principles and novel features disclosed herein.

What is claimed is:

1. A first network node for wireless communication, comprising:

at least one processor; and memory coupled with the at least one processor, wherein the at least one processor is configured to:

receive, from a second network node, downlink control information via at least one of a first physical downlink control channel candidate or a second physical downlink control channel candidate that are linked for physical downlink control channel repetition, wherein the second physical downlink control channel candidate ends later in time than the first physical downlink control channel candidate; and transmit, to the second network node, a feedback message that indicates feedback information for the downlink control information, wherein an earliest time for transmission of the feedback message is a threshold number of time units after the second physical downlink control channel candidate, and wherein the threshold number of time units is based on a smaller of a first subcarrier spacing associated with the downlink control information and a second subcarrier spacing associated with an uplink control channel allocated for the feedback message.

2. The first network node of claim 1, wherein the downlink control information is not configured to schedule a physical downlink shared channel transmission.

3. The first network node of claim 1, wherein the second physical downlink control channel candidate spans a time period that ends in a first time unit, and wherein, to transmit the feedback message, the at least one processor is configured to transmit the feedback message at least the threshold number of time units after the first time unit.

4. The first network node of claim 1, wherein the at least one processor is configured to:

receive a configuration of a first search space set and a second search space set, wherein the first search space set includes the downlink control information and the second search space set includes a repetition of the downlink control information, and wherein the at least one processor is configured to receive the downlink control information based on the first search space set including the downlink control information and the second search space set including the repetition of the downlink control information.

5. The first network node of claim 4, wherein the at least one processor is configured to:

identify at least a first monitoring occasion in the first search space set to monitor for the first physical downlink control channel candidate and a second monitoring occasion in the second search space set to monitor for the second physical downlink control channel candidate based on the first search space set including the downlink control information and the second search space set including the repetition of the downlink control information; and wherein, to receive the downlink control information, the at least one processor is configured to:

monitor at least one of the first monitoring occasion or the second monitoring occasion.

6. The first network node of claim 1, wherein the downlink control information is associated with release of semi-persistent scheduling of a physical downlink shared channel, and wherein the at least one processor is configured to:

calculate the threshold number of time units based on the downlink control information being associated with release of semi-persistent scheduling of the physical downlink shared channel, wherein, to transmit the feedback message, the at least one processor is configured to transmit the feedback message at least the calculated threshold number of time units after the second physical downlink control channel candidate.

7. The first network node of claim 1, wherein the downlink control information is associated with secondary cell dormancy without scheduling a physical downlink shared channel, and wherein the at least one processor is configured to:

calculate the threshold number of time units based on the downlink control information being associated with secondary cell dormancy without scheduling the physical downlink shared channel, wherein, to transmit the feedback message, the at least one processor is configured to transmit the feedback message at least the calculated threshold number of time units after the second physical downlink control channel candidate.

8. The first network node of claim 1, wherein the downlink control information is associated with a request for one-shot feedback without scheduling a physical downlink shared channel, and wherein the at least one processor is configured to:

calculate the threshold number of time units based on the downlink control information being associated with the request for one-shot feedback without scheduling the physical downlink shared channel, wherein, to transmit the feedback message, the at least one processor is configured to transmit the feedback message at least the calculated threshold number of time units after the second physical downlink control channel candidate.

9. The first network node of claim 1, wherein the at least one processor is configured to:

decode at least one of the first physical downlink control channel candidate or the second physical downlink control channel candidate, wherein the at least one processor is configured to receive the downlink control information based on the decoding.

10. The first network node of claim 1, wherein the at least one processor is configured to:

soft combine a signal associated with the first physical downlink control channel candidate with a signal associated with the second physical downlink control channel candidate; and decode the soft-combined signal, wherein the at least one processor is configured to receive the downlink control information based on the decoding.

11. The first network node of claim 1, wherein the at least one processor is configured to:

decode at least one of the first physical downlink control channel candidate or the second physical downlink control channel candidate, wherein, to transmit the feedback message, the at least one processor is configured to transmit the feedback message via a set of time and frequency resources based on the decoding, wherein the set of time and frequency resources is at least the threshold number of time units after the second physical downlink control channel candidate.

12. The first network node of claim 1, wherein the threshold number of time units is based on a subcarrier spacing configuration and a processing capability.

13. A first network node for wireless communication, comprising:

at least one processor; and memory coupled with the at least one processor, wherein the at least one processor is configured to:

transmit, to a second network node, downlink control information using a first physical downlink control channel candidate and a second physical downlink control channel candidate that are linked for physical downlink control channel repetition, wherein the second physical downlink control channel candidate ends later in time than the first physical downlink control channel candidate; and receive, from the second network node, a feedback message indicating feedback information for the downlink control information, wherein an earliest time for transmission of the feedback message is a threshold number of time units after the second physical downlink control channel candidate, and wherein the threshold number of time units is based on a smaller of a first subcarrier spacing associated with the downlink control information and a second subcarrier spacing associated with an uplink control channel allocated for the feedback message.

14. The first network node of claim 13, wherein the at least one processor is configured to:

identify a set of resources for feedback transmission during a time unit at least the threshold number of time units after the second physical downlink control channel candidate based on the downlink control information not scheduling a physical downlink shared channel.

15. The first network node of claim 13, wherein the second physical downlink control channel candidate spans a time period that ends in a first time unit, and wherein, to receive the feedback message, the at least one processor is configured to receive the feedback message at least the threshold number of time units after the first time unit.

16. The first network node of claim 13, wherein the at least one processor is configured to:

transmit a configuration of a first search space set and a second search space set, wherein the first search space set includes the downlink control information and the second search space set includes a repetition of the downlink control information, and wherein the at least one processor is configured to transmit the downlink control information based on the first search space set including the downlink control information and the second search space set including the repetition of the downlink control information.

17. The first network node of claim 13, wherein the downlink control information is associated with release of semi-persistent scheduling of a physical downlink shared channel, and wherein the at least one processor is configured to:

calculate the threshold number of time units based on determining that the downlink control information is associated with release of semi-persistent scheduling of the physical downlink shared channel, wherein, to receive the feedback message, the at least one processor is configured to receive the feedback message at least the calculated threshold number of time units after the second physical downlink control channel candidate.

18. The first network node of claim 13, wherein the downlink control information is associated with secondary cell dormancy without scheduling a physical downlink shared channel, and wherein the at least one processor is configured to:

calculate the threshold number of time units based on determining that the downlink control information is associated with secondary cell dormancy without scheduling the physical downlink shared channel, wherein, to receive the feedback message, the at least one processor is configured to receive the feedback message at least the calculated threshold number of time units after the second physical downlink control channel candidate.

19. The first network node of claim 13, wherein the downlink control information is associated with a request for one-shot feedback without scheduling a physical downlink shared channel, and wherein the at least one processor is configured to:

calculate the threshold number of time units based on determining that the downlink control information is associated with the request for one-shot feedback without scheduling the physical downlink shared channel, wherein, to receive the feedback message, the at least one processor is configured to receive the feedback message at least the calculated threshold number of time units after the second physical downlink control channel candidate.

20. The first network node of claim 13, wherein the threshold number of time units is based on a subcarrier spacing configuration and a processing capability.

21. The first network node of claim 13, wherein the downlink control information is not configured to schedule a physical downlink shared channel transmission.

* * * * *